United States Patent
Tanaka

[11] Patent Number: 5,966,138
[45] Date of Patent: *Oct. 12, 1999

[54] IMAGE PROCESSING METHOD AND APPARATUS FOR ROTATING AN IMAGE IN AN AREA OF AN ORIGINAL

[75] Inventor: Tetsuomi Tanaka, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,586

[22] Filed: Apr. 22, 1996

[30] Foreign Application Priority Data

Apr. 21, 1995 [JP] Japan .................................. 7-096642
May 31, 1995 [JP] Japan .................................. 7-134233

[51] Int. Cl.⁶ .................................................. G06T 3/00
[52] U.S. Cl. .................................................. 345/437
[58] Field of Search .................... 395/133–139; 345/433–439

[56] References Cited

U.S. PATENT DOCUMENTS 5,471,549  11/1995  Kurosu et al. .......................... 382/290
5,670,982   9/1997  Zhao ....................................... 345/126

FOREIGN PATENT DOCUMENTS 0701229  3/1996  European Pat. Off. .

OTHER PUBLICATIONS

Patent Abstracts of Japan, vol. 017, No. 488 (P–1606), Sep. 3, 1993.
"Programming Pearls", Bentley J., p. 14, par. 5, p. 15, par. 2, Addisson–Wesley, Reading, Massachusetts, 1986.
"Method for Rotating an 8×8 Bit Image", G. Goertzel, IBM Technical Disclosure Bulletin, pp. 4593–4595, vol. 27, No. 8, New York, NY, Jan. 1985.
"90° and 270° Rotation of a $2^n$ Binary Image Using a $2^n$ Bit Processor", IBM Technical Disclosure Bulletin, pp. 26–28, vol. 30, No. 12, New York, NY, May 1988.
"Digital Analysis of Rotated Images", S. Alliney, Proceedings of the SPIE, pp. 286–293, vol. 535, Jan. 1, 1985.

*Primary Examiner*—Almis R. Jankus
*Attorney, Agent, or Firm*—Fitzpatrick, Cella, Harper & Scinto

[57] ABSTRACT

When an image is to be rotated, the image is divided into blocks each having a predetermined size, and rotation of the image is realized by rotation of the respective blocks and rotation in units of blocks over the entire image. In this case, lines included in each block are moved to a predetermined region so that the lines are continuous in the order of lines. In the region in which the lines are moved as described above, predetermined digit positions in the respective lines appear at intervals of pixels for one line irrespective of the digit positions. After the respective digits are set to have a predetermined positional relationship between lines, since a logic operation is simultaneously performed for a plurality of lines, a plurality of pixels can be simultaneously moved to have a positional relationship after rotation. Also, a plurality of sets of pixels having the positional relationship after rotation can be similarly, simultaneously moved.

63 Claims, 34 Drawing Sheets

FIG. 1

```
#define bitcombine (shiftpat1,shiftpat2)              ¥
        work=((shiftpat1)&mask2) | ((shiftpat2)&mask1) ; ¥
        work |=work>>7 ;            ¥
        work |=work>>14 ;
```

```
/*uint32  4-BYTE UNSIGNED INTEGER  */
unsigned char    *p_from,*p_to ;
int    row_from,row_to ;
uint32 work,tmp1,tmp2 ;
uint32 mask1=0x01010101 ;
uint32 mask2=0x10101010 ;
```

— S11
SET p_from
SET p_to

— S12
```
tmp1 = (uint32)p_from[0]<<24;       p_from+=row_from;
tmp1 |= (uint32)p_from[0]<<16;      p_from+=row_from;
tmp1 |= (uint32)p_from[0]<<8;       p_from+=row_from;
tmp1 |= (uint32)p_from[0];          pfrom+=row_from;
tmp2 = (uint32)p_from[0]<<24;       p_from+=row_from;
tmp2 |= (uint32)p_from[0]<<16;      p_from+=row_from;
tmp2 |= (uint32)p_from[0]<<8;
tmp2 |= (uint32)p_from[row_from];
```

— S13
```
bitcombine(tmp1<<4,tmp2);
*p_to=(unsigned char)work;          p_to+=row_to;
bitcombine(tmp1<<3,tmp2>>1);
*p_to=(unsigned char)work;          p_to+=row_to;
bitcombine(tmp1<<2,tmp2>>2);
*p_to=(unsigned char)work;          p_to+=row_to;
bitcombine(tmp1<<1,tmp2>>3);
*p_to=(unsigned char)work;          p_to+=row_to;
bitcombine(tmp1,tmp2>>4);
*p_to=(unsigned char)work;          p_to+=row_to;
bitcombine(tmp1>>1,tmp2>>5);
*p_to=(unsigned char)work;          p_to+=row_to;
bitcombine(tmp1>>2,tmp2>>6);
*p_to=(unsigned char)work;          p_to+=row_to;
bitcombine(tmp1>>3,tmp2>>7);
*p_to=(unsigned char)work;          p_to+=row_to;
```

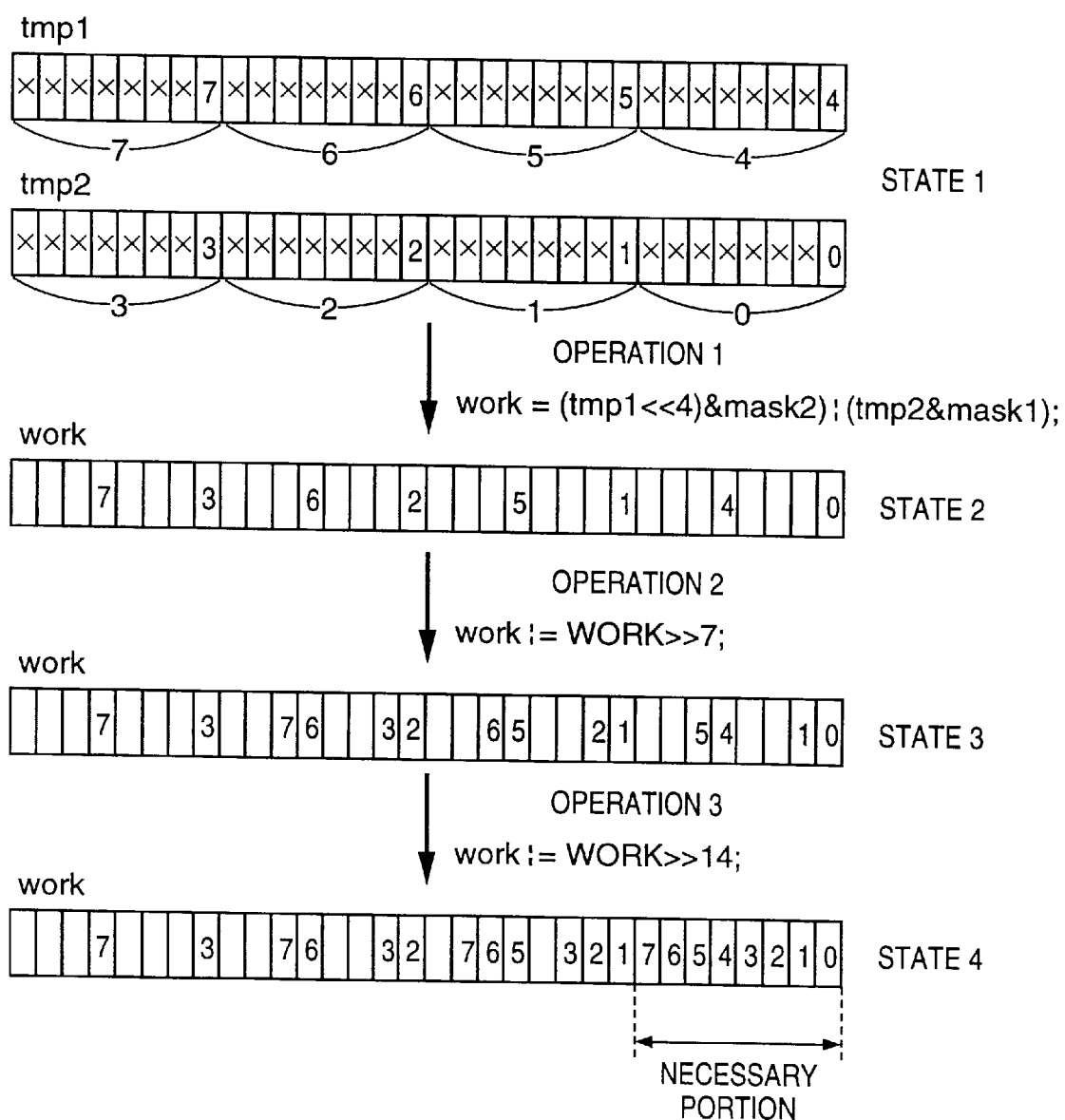

FIG. 7

```
#define bitcombine2 ()                                          ¥
        work=((work>>1)&mask1) | ((work&mask1)<<1);      ¥
        work=((work>>2)&mask2) | ((work&mask2)<<2);      ¥
        work=((work>>4)&mask3) | ((work&mask3)<<4);

/*uint32  4-BYTE UNSIGNED INTEGER */
unsigned char    *p_from,*p_to ;
int     row_from,row_to,rem1,rem;
uint32 work;
uint32 mask1 = 0x55555555;
uint32 mask2 = 0x33333333;
uint32 mask3 = 0x0f0f0f0f;
rem2=32-rem1;
```

S71
```
SET p_from
SET p_to
```

S72
```
p_from+=4;
work=(uint32)p_from[4];
work |=(uint32)p_from[3]<<8;
work |=(uint32)p_from[2]<<16;
work |=(uint32)p_from[1]<<24;
 - - - PROCESSING WHEN rem1 ≠ 0
work=(work>>rem1) | ((uint32)p_from[0]<<rem2);
 - - -
```

S73
```
bitcombine2();
p_to[0] = (unsigned char)work;
p_to[1] = (unsigned char)(work>>=8);
p_to[2] = (unsigned char)(work>>=8);
p_to[3] = (unsigned char)(work>>=8);
p_to+=4;
```

FIG. 9

```
#define bitcombine (shiftpat1,shiftpat2)                    ¥
        work=((shiftpat1)&mask2)|((shiftpat2)&mask1) ;       ¥
        work|=work>>7 ;                                      ¥
        work|=work>>14 ;

/*uint32  4-BYTE UNSIGNED INTEGER */
unsigned char    *p_from,*p_to ;
int     row_from,row_to ;
uint32 work,tmp1,tmp2 ;
uint32 mask1=0x01010101 ;
uint32 mask2=0x10101010 ;
```

S91: 
```
SET p_from
SET p_to
```

S92:
```
tmp2 = (uint32)p_from[0];          p_from+=row_from;
tmp2|= (uint32)p_from[0]<<8;       p_from+=row_from;
tmp2|= (uint32)p_from[0]<<16;      p_from+=row_from;
tmp2|= (uint32)p_from[0]<<24;      p_from+=row_from;
tmp1 = (uint32)p_from[0]           p_from+=row_from;
tmp1|= (uint32)p_from[0]<<8;       p_from+=row_from;
tmp1|= (uint32)p_from[0]<<16;
tmp1|= (uint32)p_from[row_from]<<24;
```

S93:
```
bitcombine(tmp1>>3,tmp2>>7);
*p_to=(unsigned char)work;         p_to+=row_to;
bitcombine(tmp1>>2,tmp2>>6);
*p_to=(unsigned char)work;         p_to+=row_to;
bitcombine(tmp1>>1,tmp2>>5);
*p_to=(unsigned char)work;         p_to+=row_to;
bitcombine(tmp1,tmp2>>4);
*p_to=(unsigned char)work;         p_to+=row_to;
bitcombine(tmp1<<1,tmp2>>3);
*p_to=(unsigned char)work;         p_to+=row_to;
bitcombine(tmp1<<2,tmp2>>2);
*p_to=(unsigned char)work;         p_to+=row_to;
bitcombine(tmp1<<3,tmp2>>1);
*p_to=(unsigned char)work;         p_to+=row_to;
bitcombine(tmp1<<4,tmp2&mask1);
*p_to=(unsigned char)work;
```

```
#define bitcombine4 (shiftpat)          ¥
        work=(shiftpat)&mask; ¥
        work|=work>>6 ;       ¥
        work|=work>>12 ;

/*uint32  4-BYTE UNSIGNED INTEGER */
unsigned char    *p_from,*p_to ;
int     row_from,row_to ;
uint32 work,tmp;
uint32 mask=0x03030303 ;
```

FIG. 12

```
#define bitcombine5 (shiftpat1,shiftpat2)           ¥
        work=((shiftpat1)&mask2)|((shiftpat2)&mask1) ; ¥
        work|=work>>6 ;

/*uint32  4-BYTE UNSIGNED INTEGER */
unsigned char    *p_from,*p_to ;
int      row_from,row_to ;
uint32 work,tmp1,tmp2 ;
uint32 mask1=0x03030303 ;
uint32 mask2=0x30303030 ;
```

```
SET p_from
SET p_to
```
— S121

```
tmp2 = (uint32)p_from[0];              p_from+=row_from;
tmp2 |= (uint32)p_from[0]<<8;          p_from+=row_from;
tmp1 |= (uint32)p_from[0];
tmp1 |= (uint32)p_from[row_from]<<8;
tmp1 |= tmp1<<14;
tmp2 |= tmp2<<14;
```
— S122

```
bitcombine5(tmp1,tmp2>>4);
*p_to=(unsigned char)(work>>16);       p_to+=row_to;
*p_to=(unsigned char)work;             p_to+=row_to;
bitcombine5(tmp1<<4,tmp2);
*p_to=(unsigned char)(work>>16);       p_to+=row_to;
*p_to=(unsigned char)work;
```
— S123

```
#define bitcombine6 ()              ¥
        work=tmp&mask ; ¥
        tmp=(tmp>>4)&mask ; ¥
        work|=work>>4 ;
        tmp|=tmp>>4 ;

/*uint32   4-BYTE UNSIGNED INTEGER */
unsigned char     *p_from,*p_to ;
int      row_from,row_to ;
uint32 work,tmp ;
uint32 mask=0x0f0f0f0f ;
```

FIG. 20

FIG. 21
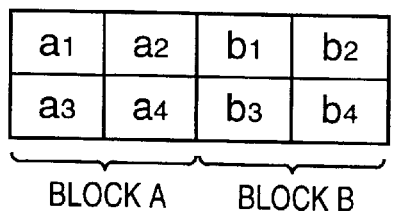
BLOCK A   BLOCK B
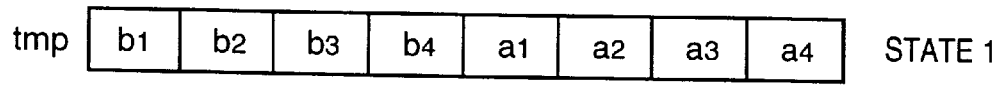   STATE 1
OPERATION 1
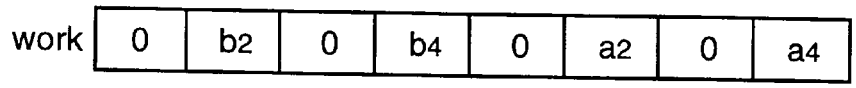
STATE 2
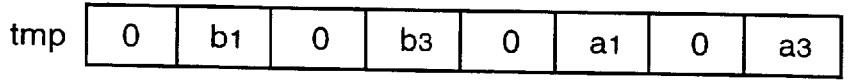
OPERATION 2
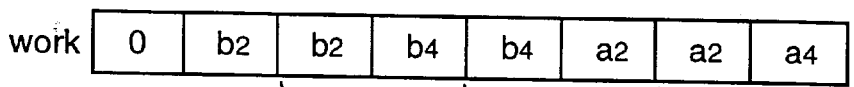
FIRST LINE   THIRD LINE   STATE 3
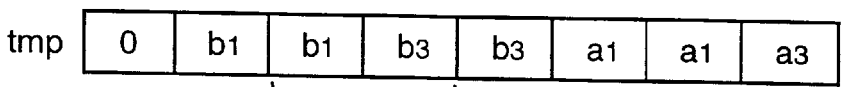
SECOND LINE   FOURTH LINE
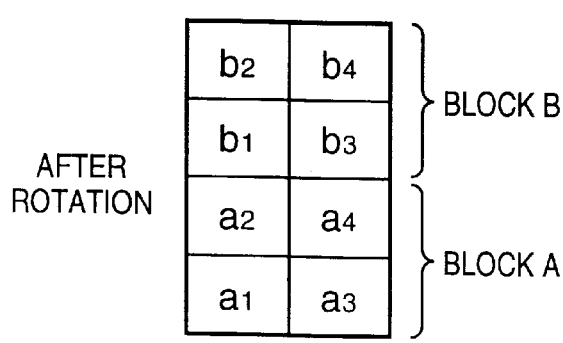
AFTER ROTATION   BLOCK B   BLOCK A

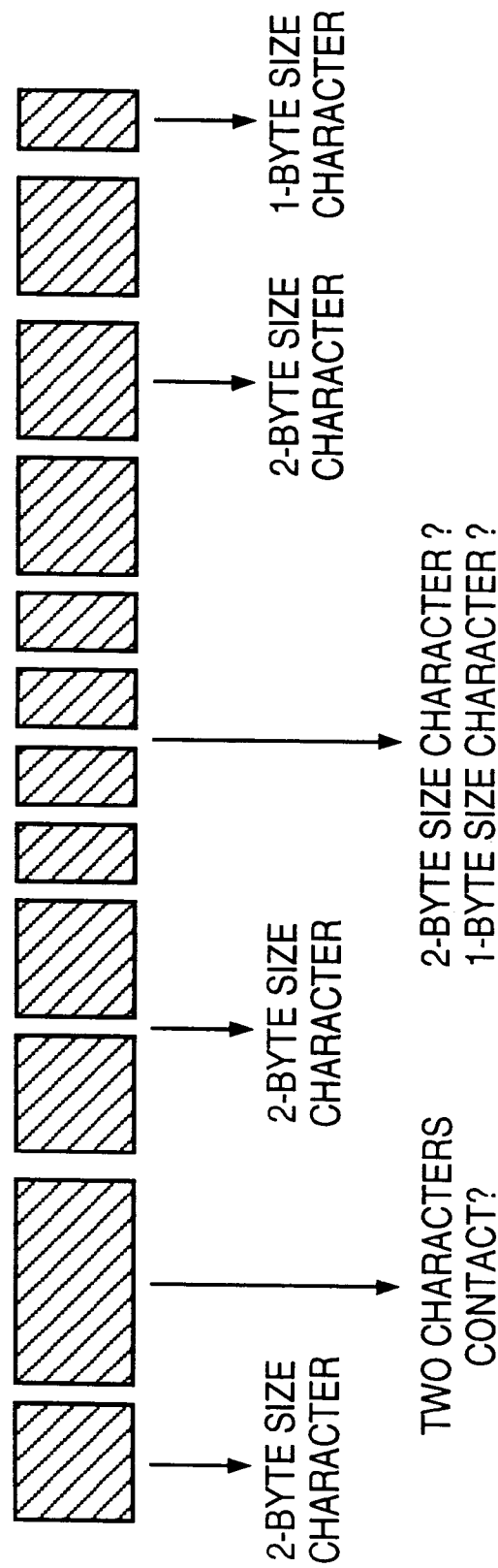

FIG. 32

| DIRECTION<br>BLOCK | DIRECTION 1 → | DIRECTION 2 ↗ | DIRECTION 3 ↑ | DIRECTION 4 ↖ |
|---|---|---|---|---|
| 1 | | | | |
| 2 | | | | |
| 3 | | | | |
| ⋮ | | | | |
| 16 | | | | |

1 + 100 = 101 ←ROTATION→

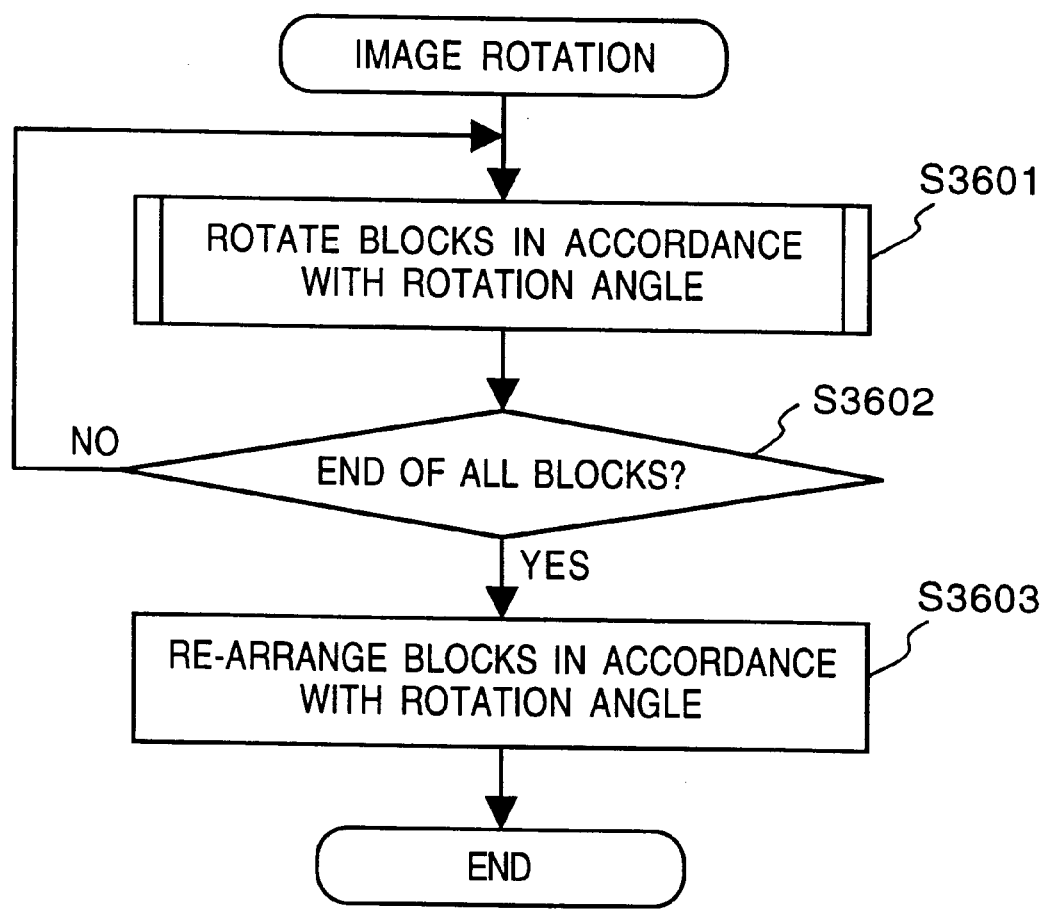

IMAGE PROCESSING METHOD AND APPARATUS FOR ROTATING AN IMAGE IN AN AREA OF AN ORIGINAL

BACKGROUND OF THE INVENTION

The present invention relates to an image processing method and apparatus for drawing a bitmap image obtained by rotating an image in an arbitrary area of input bitmap data.

A bitmap rotation method for drawing bit map images obtained by rotating an image in an arbitrary area of input bitmap data through 90°× n (n=1, 2, 3) includes the following methods. In the following description, the rotation angle represents that in the counterclockwise direction, and the leftmost pixel corresponds to bit 7 unless otherwise specified.

FIG. 5 summarizes a principal part of conventional 90° rotation processing of an image.

The rotation processing is performed in units of 8-byte blocks each consisting of 1 byte×8 lines (8×8 pixels). Referring to FIG. 5, p_from and p_to are respectively the output and input pointers of a block to be processed, and a suffix [n] indicates an address advanced by n bytes. For example, $p_{13}$ from[2] indicates an address advanced by 2 bytes from p_from[0]. row_from and row_to are the numbers of bytes per line of images before and after rotation, and work is a work variable for the rotation processing.

A symbol "=" represents substitution from the right-hand side to the left-hand side, and a symbol ":=" represents substitution of the OR of the right- and left-hand sides into the left-hand side. On the other hand, a symbol "+=" represents addition of the right-hand side to the left-hand side.

In step S51, initialization is performed, i.e., variables such as a pointer p_from indicating a block to be rotated, a pointer p_to indicating a rotated block, and the like are initialized.

Steps S52-1 to S52-8 correspond to the main rotation processing. In order to generate data of one rotated block (8 bytes), 8-byte data of an original block is transferred to a variable work in units of pixels per operation to generate rotated data in the variable work, and the rotated data is written in a buffer indicated by the pointer p_to.

In steps S52-1 to S52-8, the respective columns of a non-processed block (8 rows×8 columns) are moved to the respective rows of a processed block. In step S52-1, pixels in the rightmost column of the non-processed block are moved to the uppermost row of the processed block. Note that words "right, left, up, and down" indicate the corresponding positions when an 8 (pixels) ×8 (pixels) block is visually considered. In this case, the pixels are moved as follows. That is, a pixel in the leftmost column of an i-th row of a non-processed block is moved to an i-th column of the uppermost row of a processed block. This movement is repeated in turn for i=1 to 8. Similarly, in step S52-2, the second column from the right side of the non-processed block is moved to the second row of the processed block. In this manner, the pixels are sequentially moved up to the eighth column to rotate one block through 90°.

Upon completion of step S52, the flow returns to step S51 to process the next block.

FIGS. 6A and 6B show conventional 180° rotation processing. FIG. 6A shows a case wherein a 256-byte look-up table (LUT) is used, and FIG. 6B shows a case wherein movement in units of pixels is repeated as in the conventional 90° rotation processing. In the example using the LUT, a non-processed block is converted using an LUT "table" in units of rows, i.e., bytes to obtain a converted block. The LUT "table" has a value obtained by reversing the order of a binary value i as the contents of an i-th byte from the beginning. For example, the (0x05)-th byte of the LUT "table" has a value 0xA0 obtained by reversing its order as a binary value. For this reason, in step S602, a value obtained by rotating a byte indicated by a pointer p_from through 180° is assigned to a processed block indicated by a pointer p_to. Every time one row is processed, the pointer p_from is advanced by one row and the pointer p_to is returned by one row. When this processing is performed for eight rows, rotation of one block is completed.

In FIG. 6B, in step S612, one row (one byte) of a non-processed block is reversed, i.e., rotated through 180°. This processing is performed in turn from upper rows of the non-rotated block, and the rotated rows are assigned in turn from the lower rows of a rotated block, thereby obtaining a block rotated through 180°.

In this connection, the 90° rotation processing may use an LUT.

However, in the conventional method, since processing is performed in units of bits, the processing speed is low. In addition, in order to perform processing in units of bits, data must be accessed for each processing unit including a target bit, e.g., in units of bytes. For this reason, the processing time is further prolonged since 8-byte data must be accessed each time rotated one-byte data is generated. Such long processing time becomes conspicuous in a system having no data cache. Although a 16-bit processor can perform a 16-bit arithmetic operation and a 32-bit processor can perform a 32-bit arithmetic operation, a portion actually used in the arithmetic operation is only an 8-bit (1-byte) portion, resulting in wasteful processing.

When the LUT is used, since the number of data accesses increases, a data cache is preferably arranged to attain high-speed processing. In order to attain higher-speed processing using the LUT, assume that the table size is increased, e.g., is changed to convert a block in units of 2 bytes so as to decrease the number of accesses. In this case, the table size in units of bytes is $1 \times 2^8$ bytes, while the table size in units of 2 bytes is $2 \times 2^{16}$ bytes, i.e., becomes 512 times that in units of bytes. However, as compared to this increase in table size, the number of accesses to the LUT can only be halved, resulting in very poor efficiency. On the contrary, in a system having a data cache, the cache hit rate may lower, and the system speed may decrease.

As an equipment to which image rotation is applied, a digital copying machine is known.

In a digital copying machine, an original image or the like is optically read, and an image is formed on a recording sheet after digital processing. In such an apparatus, document sheets including a plurality of pages are read in turn, and images can be formed on recording sheets. The direction of a copied document image has a one-to-one correspondence with that of an original document image provided to the apparatus. In an electronic filing apparatus as well, a read image is displayed on a display in correspondence with the read direction.

Therefore, when a document image is input, a copied document image cannot have a normal direction unless a document image is input in a normal direction. For example, when one of a plurality of document pages is set upside down, only a document image corresponding to the page is copied upside down. When a copying operation is executed in this state, the user must confirm the page after he or she inputs documents, and must adjust the document directions by picking up the page set in the wrong direction. In the electronic filing apparatus, a document page read in a wrong direction must be set again on a reader in a normal direction and subjected to read processing again, or an input document image must be rotated by user's designation.

As described above, in the conventional digital copying machine or electronic filing apparatus, when an original image is input in a wrong direction, the user is required to perform some correction operations, resulting in a heavy load on the user.

SUMMARY OF THE INVENTION

The present invention has been made in consideration of the above situation, and has as its object to provide an image processing method and apparatus, which can process a plurality of pixels in a single arithmetic operation by simultaneously storing and processing data of divided blocks across a plurality of bytes in a variable having a multi-byte length, and can reduce the total number of times of arithmetic operations.

It is another object of the present invention to provide an image processing method and apparatus which can reduce the number of times of arithmetic operations by performing pixel re-arrangement for rotation stepwise in the order from smaller portions to larger portions.

It is still another object of the present invention to provide an image processing method and apparatus which can raise a cache hit rate with respect to a given capacity of a data cache and can increase the processing speed by performing processing of blocks in the order in which the addresses of an original image to be subjected to rotation processing continue.

Furthermore, the present invention has been made in consideration of the above-mentioned problems and has as its still another object to provide an image processing method and apparatus, which can discriminate the direction of an image on the basis of read image data.

It is still another object of the present invention to provide an image processing method for dividing a bitmap image into rectangular blocks each having a predetermined size and performing rotation processing in units of blocks, comprising:

the storage step of connecting a plurality of lines included in a block of interest and storing the connected lines in a region having a predetermined length;

the pixel replacement step of replacing pixels included in the region in a predetermined order by performing a predetermined logic operation for the pixels stored in the region in units of the length of the region; and the control step of forming a rotated block by controlling the pixel replacement step so as to replace the order of all the pixels included in the block of interest.

It is still another object of the present invention to provide an image processing apparatus for dividing a bitmap image into rectangular blocks each having a predetermined size and performing rotation processing in units of blocks, comprising:

storage means for connecting a plurality of lines included in a block of interest and storing the connected lines in a region having a predetermined length;

pixel replacement means for replacing pixels included in the region in a predetermined order by performing a predetermined logic operation for the pixels stored in the region in units of the length of the region; and control means for forming a rotated block by controlling the pixel replacement means so as to replace the order of all the pixels included in the block of interest.

It is still another object of the present invention to provide a computer readable memory for storing a program for dividing a bitmap image into rectangular blocks each having a predetermined size and performing rotation processing in units of blocks, comprising:

a code of the storage step of connecting a plurality of lines included in a block of interest and storing the connected lines in a region having a predetermined length;

a code of the pixel replacement step of replacing pixels included in the region in a predetermined order by performing a predetermined logic operation for the pixels stored in the region in units of the length of the region; and a code of the control step of forming a rotated block by controlling the pixel replacement step so as to replace the order of all the pixels included in the block of interest.

It is still another object of the present invention to provide an image processing method comprising:

the cut-out step of cutting out a character image from an image;

the discrimination step of discriminating a direction of the character image cut out in the cut-out step; and the determination step of determining the direction of the image on the basis of a discrimination result in the discrimination step.

It is still another object of the present invention to provide an image processing method comprising:

the cut-out step of cutting out a plurality of character images from an image;

the calculation step of calculating similarities, in a plurality of directions, of each of the character images cut out in the cut-out step; and the determination step of determining a direction of the image as one of the plurality of directions on the basis of the similarities calculated in the calculation step.

It is still another object of the present invention to provide an image processing apparatus comprising:

cut-out means for cutting out a character image from an image;

discrimination means discriminating a direction of the character image cut out by the cut-out means; and determination means for determining the direction of the image on the basis of a discrimination result of the discrimination means.

It is still another object of the present invention to provide an image processing apparatus comprising:

cut-out means for cutting out a plurality of character images from an image;

calculation means for calculating similarities, in a plurality of directions, of each of the character images cut out by the cut-out means; and determination means for determining a direction of the image as one of the plurality of directions on the basis of the similarities calculated by the calculation means.

It is still another object of the present invention to provide a computer readable memory for storing a program of image processing, comprising:

a code of the cut-out step of cutting out a character image from an image;

a code of the discrimination step of discriminating a direction of the character image cut out in the cut-out step; and a code of the determination step of determining the direction of the image on the basis of a discrimination result in the discrimination step.

It is still another object of the present invention to provide a computer readable memory for storing a program of image processing, comprising:

a code of the cut-out step of cutting out a plurality of character images from an image;

a code of the calculation step of calculating similarities, in a plurality of directions, of each of the character images cut out in the cut-out step; and a code of the determination step of determining a direction of the image as one of the plurality of directions on the basis of the similarities calculated in the calculation step.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a flow chart showing the 90° rotation processing sequence according to the first embodiment of the present invention;

FIG. 3 is a view for explaining the 90° rotation processing sequence according to the first embodiment;

FIG. 7 is a flow chart showing the sequence of the 180° rotation processing of a block according to the second embodiment of the present invention;

FIG. 9 is a flow chart showing the sequence of the 270° rotation processing according to the fourth embodiment of the present invention;

FIG. 12 is a flow chart showing the processing sequence executed when a plurality of lines are simultaneously processed according to the sixth embodiment of the present invention;

FIG. 20 is a view showing another state wherein a block in which one pixel is expressed by 2 bits is rotated through 90° according to the fifth embodiment of the present invention;

FIG. 21 is a view showing the state of blocks when a plurality of blocks are simultaneously processed according to the seventh embodiment of the present invention;

FIG. 28 is a view showing the character cut-out state from a character region;

FIG. 32 is a view showing the storage state of data upon acquisition of feature amounts by the other method;

FIG. 36 is a flow chart showing the sequence for rotating an image by rotating blocks constituting an image and re-arranging the blocks.

DETAILED DESCRIPTION OF THE PREFERRED EMBODIMENTS

First Embodiment

Figure 14:
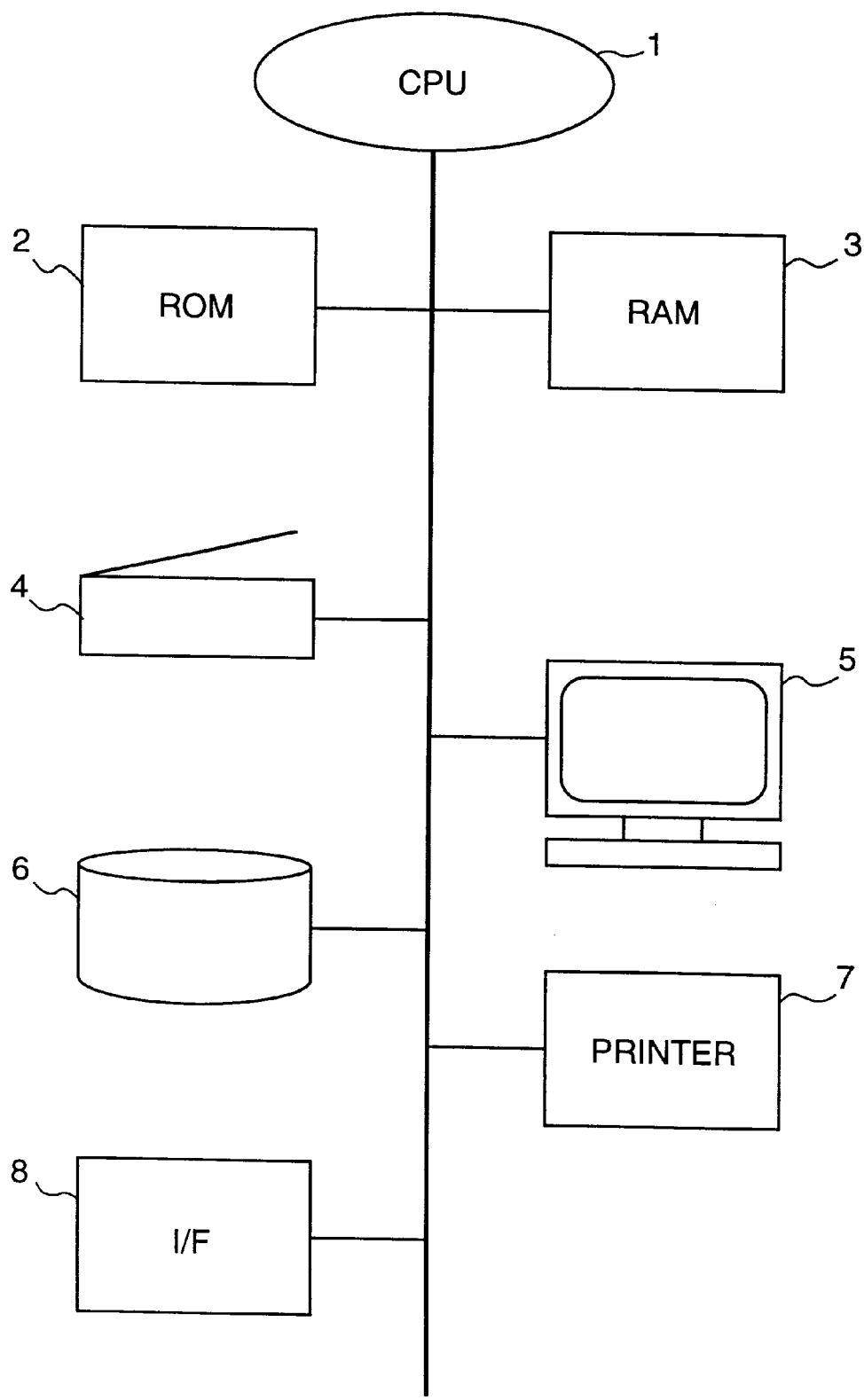
FIG. 14 is a block diagram showing the system that performs the image processing of the respective embodiments.

FIG. 14 is a block diagram showing the system for realizing rotation processing of an image as an embodiment of the present invention. Referring to FIG. 14, a CPU 1 controls the entire system by executing programs stored in a ROM 2 or a RAM 3, thereby performing image rotation processing and the like. The ROM 2 stores control programs (including programs associated with the flow charts to be described later) of the CPU 1, and data. The RAM 3 stores work data of the CPU 1 and images before and after rotation. The programs may be stored in the RAM 3. A scanner 4 is used for inputting an image. A display 5 displays an image. A storage device 6 comprises a magnetic disk device or the like, and stores images, programs, and other data. The storage device 6 may comprise a removable device. A printer 7 prints out an image and the like. An input/output interface (I/F) 8 is connected to an external device to input/output data.

Of these blocks, the following blocks are used for performing image rotation.

Printer

Data described in a page description language and input from, e.g., the input/output interface 8 is stored in the RAM 3. The CPU 1 draws the data on the RAM 3 while interpreting it, and sends the drawn bitmap data to the printer 7 to print the data on a paper sheet. In the printer 7, bitmap data is rotated, bitmap font data is rotated, or image rotation processing is performed when an A3-size printer outputs an A4-size image.

Filing Device

In FIG. 14, the storage device 6 corresponds to a filing device. In the case of an intelligent filing device which stores an original image read by the scanner 4 and performs character recognition of the read image, the original image read in a wrong direction must be rotated.

CPU

The CPU 1 stores an image read from the scanner 4 or the storage device 6 in the RAM 4, rotates the stored image, and displays the rotated image on the display 5.

As described above, the image rotation processing is performed as needed. The rotation processing is realized by the following sequence.

Sequence of Rotation Processing

FIG. 1 is a flow chart that best illustrates the image rotation processing according to the present invention.

The processing in this embodiment is performed in units of blocks each consisting of 1 byte×8 lines (8×8 pixels). Variables p_from and p_to are input and output pointers of a block to be processed. Variables row_from and row_to indicate the numbers of bytes per line of images before and after rotation. For example, assuming that the pointer p_from indicates the uppermost row (a row of interest) of a given block, the address of the next row is represented by the sum of the address of the row of interest and the size row_from for one line of an image. Variables work, tmp1, and tmp2 are work variables for the rotation processing. Note that uint32 is the data type indicating a 4-byte length integer, and is assumed to be defined beforehand. On the other hand, a symbol "&" represents an AND operation, and "|" represents an OR operation.

Referring to FIG. 1, step S11 corresponds to an initialization step. In this step, the variables such as read and write pointers of a block to be processed are initialized. More specifically, the address of a non-rotated block is stored in the variable p_from, and the address of a rotated block is stored in the variable p_to.

Figure 2A:
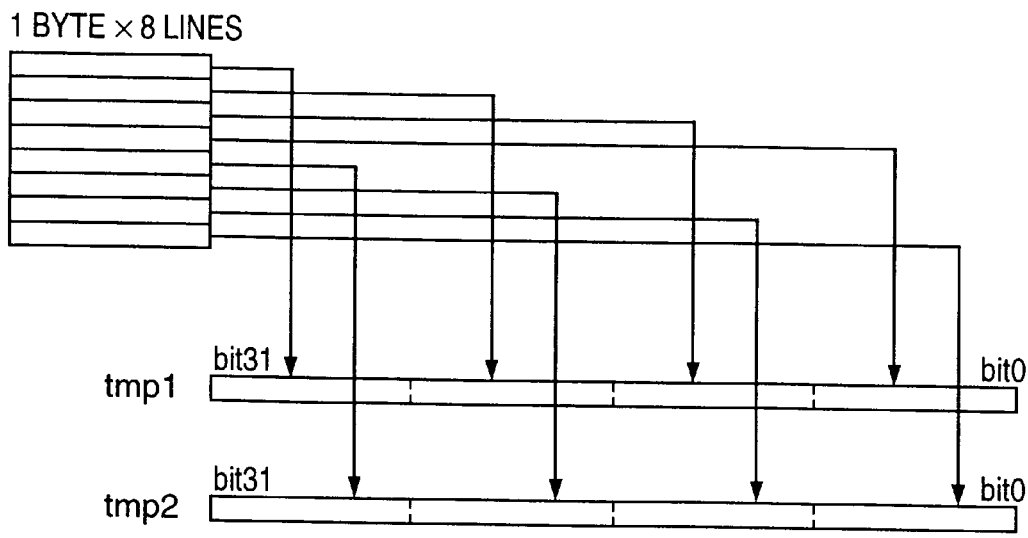
FIGS. 2A and 2B are views for explaining data packing according to the first embodiment.

Step S12 corresponds to packing processing for reading out all the data of the block to be processed and simultaneously storing the readout data in a variable larger than a 1-byte length. As shown in FIG. 2A, byte data of the respective lines in a block of 1 byte×8 lines are divided into those of upper four lines and those of lower four lines, and these data are sequentially stored in the variables tmp1 and tmp2. Note that a symbol "m<<n" represents a shift of m to the left by n bits, and a symbol "m>>n" represents a shift of m to the right by n bits.

Step S13 corresponds to processing for sequentially generating and writing rotated data on the basis of the contents of the variables tmp1 and tmp2. Note that a symbol "*p_to" represents a region indicated by the pointer p_to.

FIG. 3 shows a summary of "bitcombine(shiftpat1, shiftpat2)" macro processing of step S13. In FIG. 3, the parameter shiftpat1=4, and the parameter shiftpat2=0.

By the processing in step S12, the variables tmp1 and tmp2 respectively store pixel data of 1 byte×8 lines (seventh to 0-th lines) which are packed in units of 4 bytes. In step S13, 1-byte data obtained by arranging and rotating pixel data of the LSBs (least significant bits) of byte data of the seventh to 0-th lines is read out. In a 90° rotated state, the data form one row while the LSBs of the respective lines are arranged in sequence. Note that values matching the line numbers are written in the LSBs of the respective bytes for the sake of easy understanding. The LSB of an i-th byte will be referred to as "LSBi" hereinafter. In addition, a mark "X" represents that the value does not care.

Operation 1 is a logic operation for reading out pixel data of LSB7 to LSB0 from the variables tmp1 and tmp2 shown in state 1, and storing the readout data in a variable work. In this operation, the contents of tmp1 are shifted to the left by 4 bits, and the shifted value and hexadecimal mask data mask2=0×10101010 are ANDed. With this operation, the value stored in the variable tmp1 is shifted to the left by 4 bits, and bits other than LSB7, LSB6, LSB5, and LSB4 of original 4-byte data become 0. Also, the contents of the variable tmp2 and hexadecimal mask data mask1=0× 01010101 are ANDed. As a result, all the bits other than the LSBs of the respective bytes in the contents of tmp2 become 0. In this manner, the value shown in state 2 is obtained in the variable work by ORing the shifted and masked contents of tmp1 and the masked contents of tmp2. In operation 1, the positional relationships between LSB7 and LSB3, between LSB6 and LSB2, between LSB5 and LSB1, and between LSB4 and LSB0 are set to be equal to those after rotation.

In operation 2, the value of the variable work shown in state 2 and a value obtained by shifting the value in state 2 to the right by 7 bits are ORed. As a result, the contents of the variable work are re-arranged, as shown in state 3, and the positional relationships between LSB7 and LSB6, LSB3 and LSB2, LSB5 and LSB4, and LSB1 and LSB0 are set to be equal to those after rotation.

Finally, in operation 3, the value of the variable work shown in state 3, and a value obtained by shifting the value in state 3 to the right by 14 bits are ORed. As a result, the contents of the variable work are re-arranged, as shown in state 4, and pixel data for the first row after bit rotation are obtained in 8 bits from the LSB of the variable work.

With the above operations "bitcombine" the rightmost column of a non-rotated block can be moved to the uppermost row of a rotated block. In order to perform the above-mentioned operations for one block, pixels extracted in the above description are moved pixel by pixel from the LSB to upper digit positions, and the same operations are repeated. In order to move pixels, the shift amounts "shiftpat1" and "shiftpat2" for the variables tmp1 and tmp2 are decreased to perform a shift operation, so that the digit positions to be processed correspond to bits 0 to 7 in state 2. Lower 1 byte of state 4 obtained in this manner corresponds to a 90° rotated row.

Figure 15:
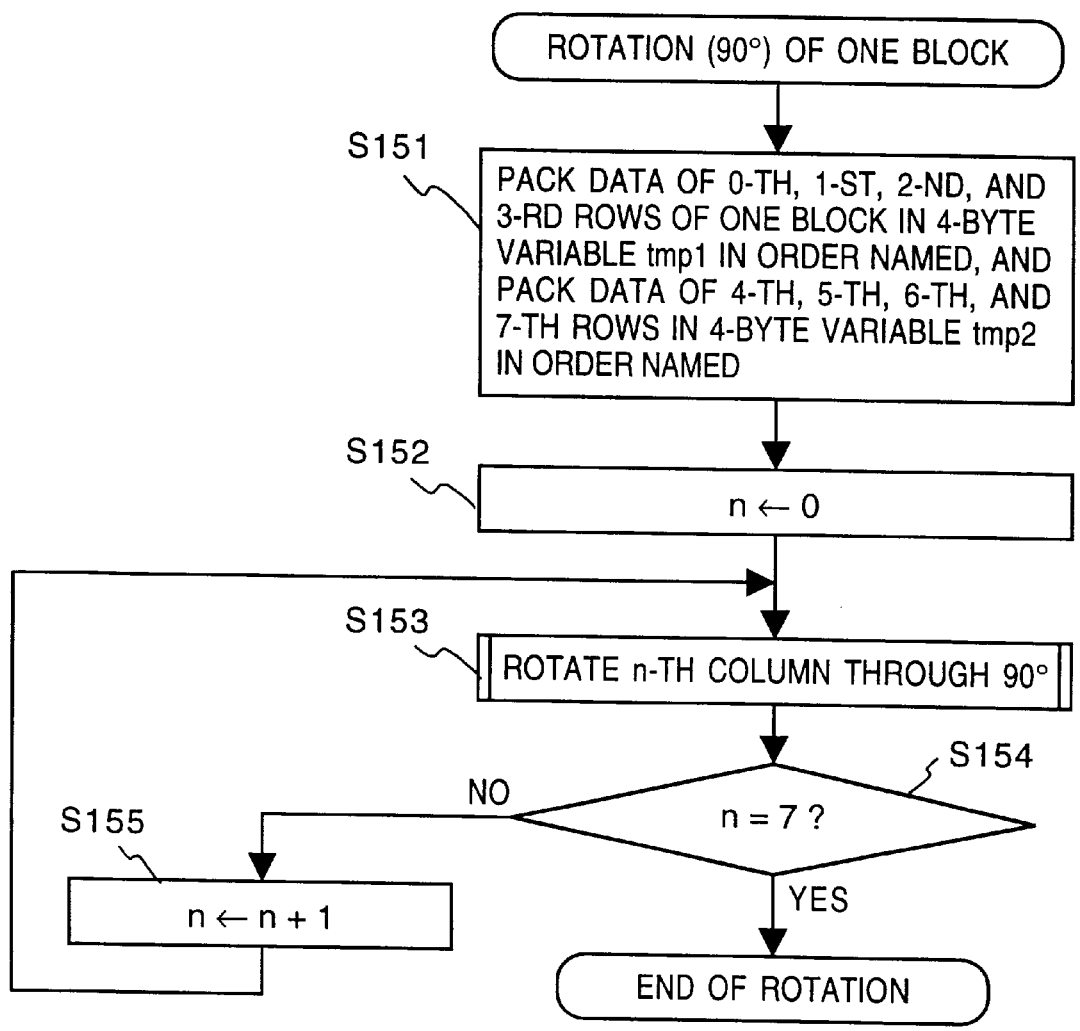
FIG. 15 is a flow chart showing the 90° rotation processing sequence according to the first embodiment of the present invention.
Figure 16:
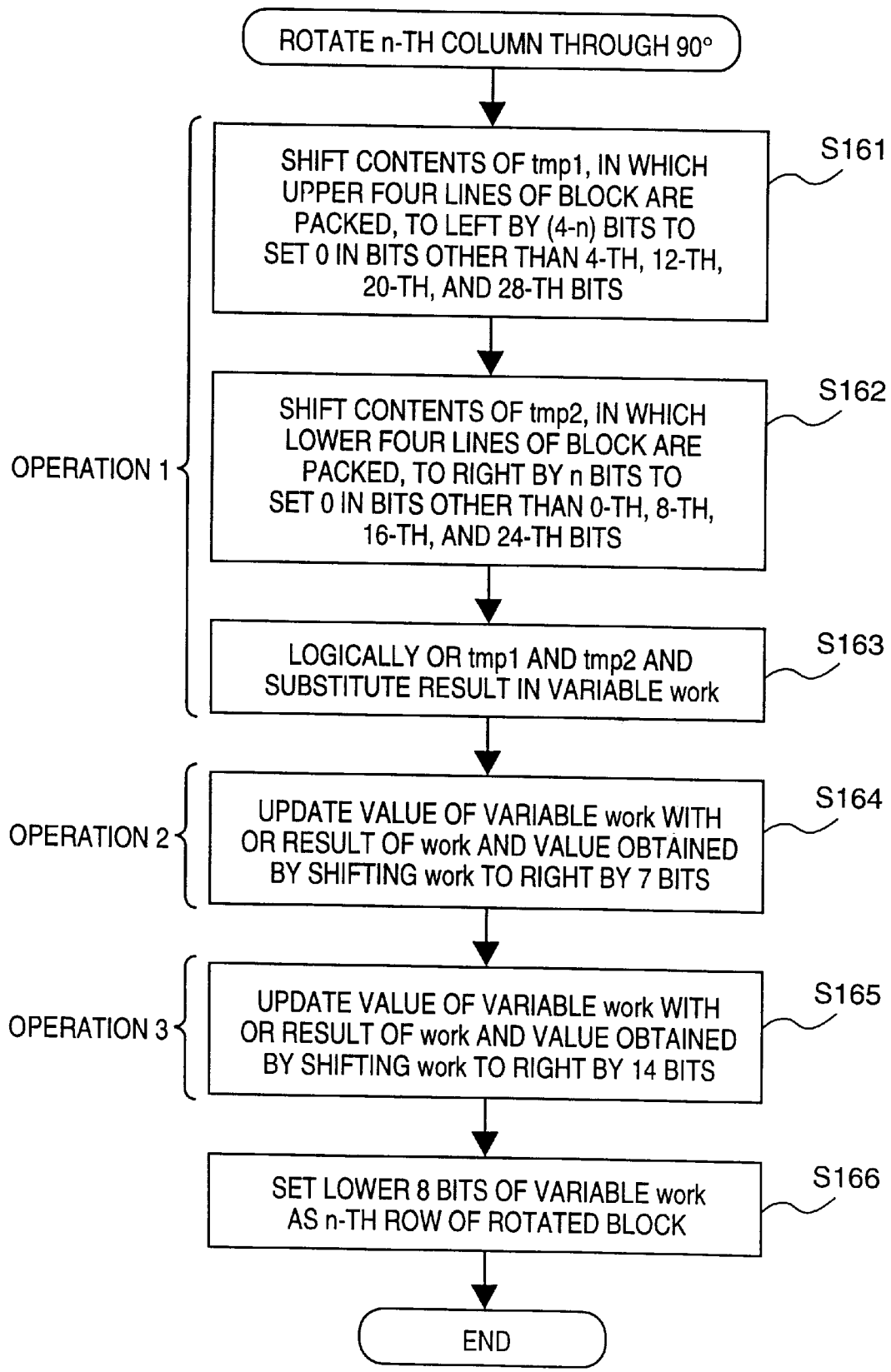
FIG. 16 is a flow chart showing the 90° rotation processing sequence according to the first embodiment of the present invention.

FIGS. 15 and 16 are flow charts showing in more detail the flow chart in FIG. 1. The CPU 1 can realize the image 90° rotation processing by executing the programs corresponding to the sequences shown in the flow charts in FIGS. 15 and 16. Referring to FIG. 15, step S151 corresponds to steps S11 and S12, and executes processing shown in FIG. 2A. Steps S152 to S155 correspond to step S13. In the description of step S13, the logic operation is performed for the respective columns. However, in FIG. 15, since the column number is generally represented by n, loop processing is added. FIG. 16 is a flow chart for explaining in detail step S153, and describing the processing of the macro bitcombine( ) in FIG. 1, i.e., the sequence described above with reference to FIG. 3, in conformity with FIG. 3.

In FIG. 16, the contents of the packed 32-bit variable tmp1 are shifted to the left by (4−n) bits to set all bits to be 0 except for 4-th, 12-th, 20-th, and 28-th bits. Note that n indicates the column (digit) to be rotated. When (4−n) is negative, the shift direction is reversed. In step S162, the contents of tmp2 are shifted to the right by n bits to set all bits to be 0 except for 0-th, 8-th, 16-th, and 24-th bits. In step S163, the results obtained in steps S161 and S162 are ORed. The above-mentioned operation corresponds to operation 1 in FIG. 3.

Steps S164 to S166 are as described above as operations 2 and 3.

In this manner, since the respective lines of a block are not processed in units of lines but are converted into continuous data and are then subjected to logic operations, a plurality of pixels can be parallelly processed in a single operation in place of one pixel per operation, resulting in high-speed processing.

More specifically, since 4-byte data are respectively packed and stored in the variables tmp1 and tmp2, even when required pixels are masked and read out from data of 1 byte×8 lines, a plurality of pixels (four pixels in this embodiment) can be read out by a single logic operation (AND operation). Since the data are packed in the variables tmp1 and tmp2 in correspondence with the arrangement of bits after rotation, stepwise pixel replacement like in operations 2 and 3 can be realized.

The variables tmp1 and tmp2 can be re-used not only in the case of bit 0 like in FIG. 3 but also when rotated data at the respective digits are to be read out. For this reason, if these values are saved, rotated data of the remaining 7 bytes (lines) can be generated without accessing image data. Even when the above-mentioned processing is executed in a system having no data cache, if tmp1 and tmp2 are assigned to register variables, they are stored in registers of the CPU 1, and rotated data can be generated without requiring any memory access, resulting in very high-speed processing. Since a plurality of image data are packed, the number of variables can be reduced, and the variables can be easily assigned to register variables. Even when the variables cannot be assigned to register variables, the number of times of data accesses can be reduced to ¼ (since an access in units of 4 bytes replaces an access in units of bytes, the number of times of accesses can be reduced from eight to two).

When the number of times of required operations is calculated in detail, in order to rotate one block of 1 byte×8 lines, one read access for each byte data is required for packing, eight or nine arithmetic operations are required for generating rotated 1-byte data from packed data, and one write access is required for each rotated byte data. In this connection, in the example shown in FIG. 3, operation 1 requires four arithmetic operations, and each of operations 2 and 3 requires two arithmetic operations. More specifically, the number of times of accesses to image data can be minimized, and rotation processing is realized by only a little over one arithmetic operation per pixel.

Figure 4A:
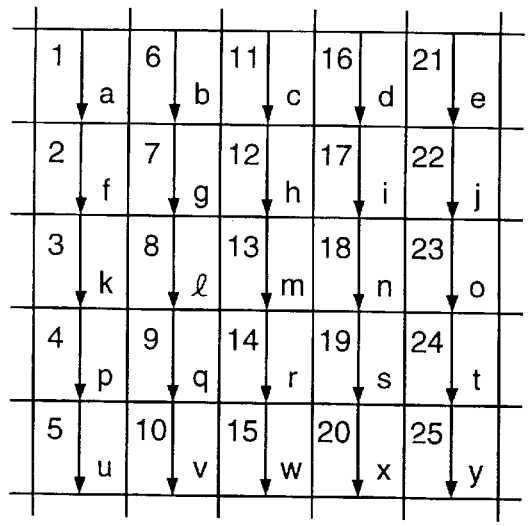
FIGS. 4A to 4C are views showing the order of block processing according to the first embodiment.
Figure 4B:
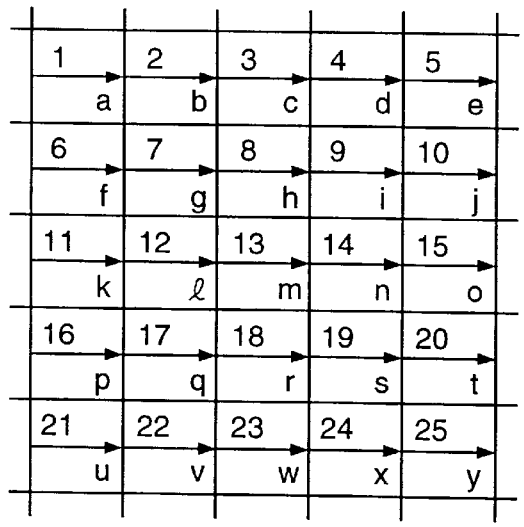
Figure 4C:
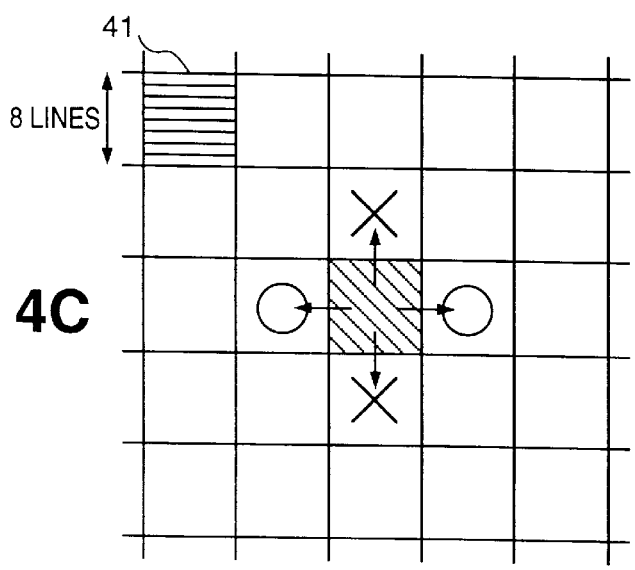
Figure 5:
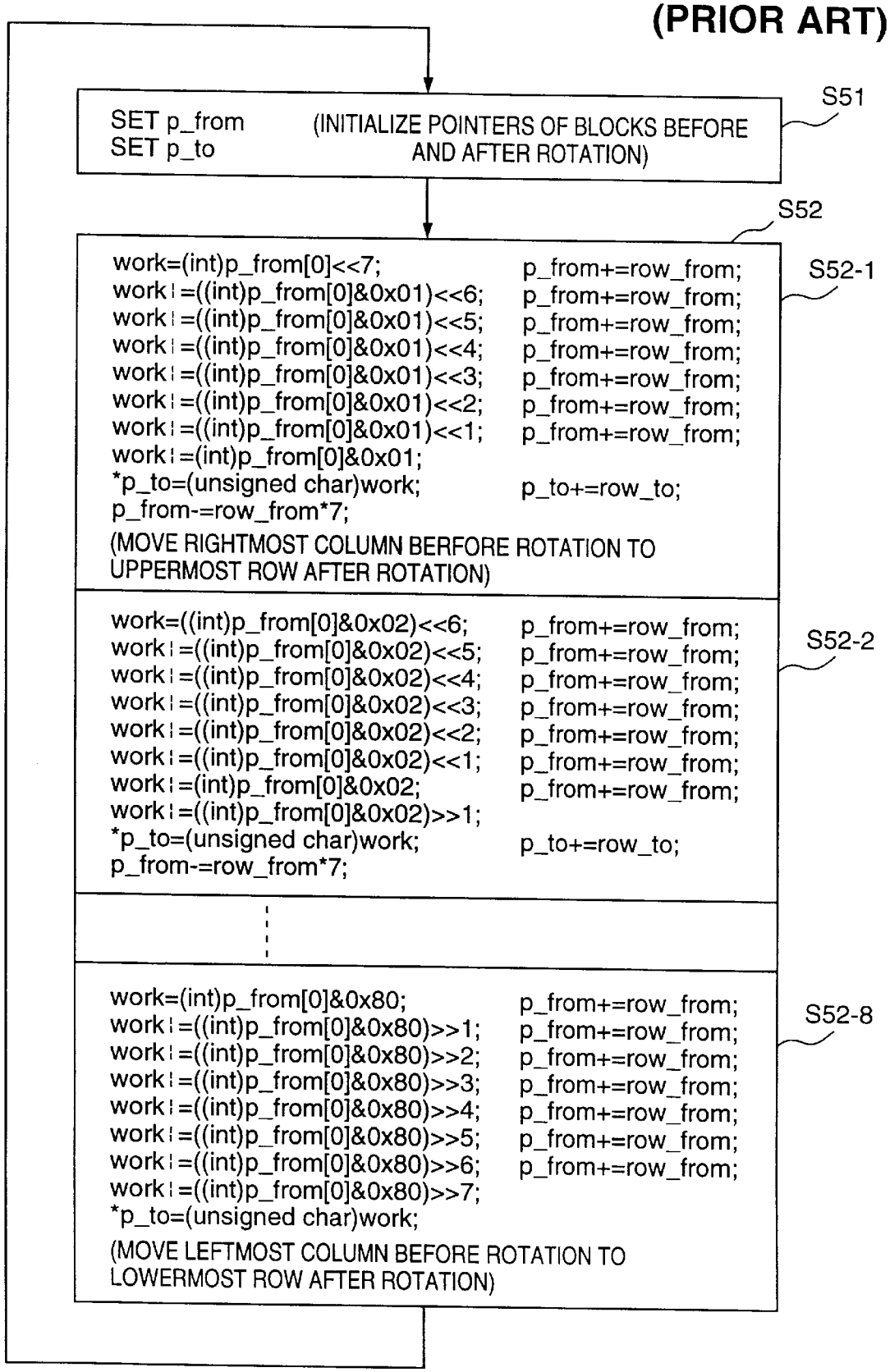
FIG. 5 is a flow chart showing the sequence of the conventional 90° rotation processing of a block.

In FIG. 1, upon completion of step S13, the flow returns to step S11 to process the next block. In this case, the next block may be a right or left block or an upper or lower block adjacent to the previous block which has already been processed. A case will be examined below wherein 25 blocks, i.e., blocks a to y each consisting of 1 byte×8 lines are processed in the order from 1 to 25, as shown in FIGS. 4A and 4B. When a data cache is used, even when one byte is to be read out, if a processor has a 32-bit data bus, four bytes on the 32-bit data bus including the byte data of interest are stored in the cache memory. For this reason, when one byte in, e.g., block m is read, data of blocks l and n are also stored in the cache memory. Since the data cache effect for block a appears upon processing of block b, when blocks are processed in the order of blocks a, f, k, p, u, b, . . . , as shown in FIG. 4A, the contents of the data cache are updated upon processing of middle blocks f, k, p, and u, and the probability of miss hit becomes high upon processing of block b. For this reason, the data cache hit rate becomes higher if the processing is done in the order shown in FIG. 4B. That is, even a small-capacity data cache can be effectively used. Therefore, as shown in FIG. 4C, when a block has a line arrangement indicated by an upper left block 41, after a hatched block is processed, a block on either one of the right and left sides (directions of circular marks) of the hatched process is preferably processed. Blocks are processed in the order in which the addresses of pixels that form an original image to be subjected to rotation processing continue.

FIG. 1 shows the case wherein all data in one block consisting of 1 byte×8 lines are complete. However, when data are incomplete like in a block at the end of an image, the following processing can be performed.

When data in eight lines are incomplete, data short portions in the variables tmp1 and tmp2 are processed as blank portions in step S12 in FIG. 1 (or step S151 in FIG. 15). When eight pixels in one byte are short, i.e., when one column is short, control can be made so that one corresponding to the short portion of eight macros bitcombine( ) in step S13 is not executed. This control corresponds to a case wherein processing is not executed for omitted n in step S153.

Variation of The Embodiment

The macro bitcombine( ) in the above embodiment, i.e., the processing sequence shown in FIG. 16 may be modified as follows to obtain the same result.

In step S161, after the 32-bit variable tmp1 is shifted, bits other than the 4-th, 12-th, 20-th, and 28-th bits are set to be 0. In this modification, these bits are set to be 1 in place of 0. Similarly, in step S162, bits other than the 0-th, 8-th, 16-th, and 24-th bits are set to be 0. Similarly, in this modification, these bits are set to be 1. Furthermore, in step S163, an OR is calculated. However, in this modification, an AND is calculated. As a result of this operation, blank digits in state 2 in FIG. 3 are filled with 1 in place of 0. The subsequent steps are the same as those in FIG. 16.

This operation is described as follows in the same manner as bitcombine( ) in the upper portion of FIG. 1.

```
mask1=0xfefefefe;
mask2=0xefefefef;
#define bitcombine(pat1,pat2)¥
    work=((pat1)|mask2)&((pat2)|mask1);¥
    work&=work>>14;¥
    work&=work>>7;
```

Note that a symbol "&=" represents substitution of an AND of the right- and left-hand sides in the left-hand side.

In this example, when the number of lines of one block is smaller than 8, pixels in a short portion become 1. In image data, since a black pixel can assume either 0 or 1, when a blank portion is set in white or black, this example and the example of FIG. 1 can be selectively used.

As described above, each block is rotated through 90°. In order to rotate the entire image, 90° rotated blocks must be re-arranged, or blocks must be re-arranged and then rotated through 90°.

The re-arrangement of the blocks is also required in 270° rotation and 180° rotation. Of course, different rotation angles require different re-arrangement methods of blocks.

FIG. 36 is a flow chart showing the rotation processing of an image including re-arrangement of blocks. Step S3601 corresponds to rotation processing of pixels in each block, and includes the processing shown in FIGS. 1, 7, 9, 10, 11, 12, 13, 15, 16, 17, and 18.

Even when steps S3601 and S3603 are replaced with each other, the same result can be obtained.

When an image is rotated, the image is divided into blocks, and the respective blocks are rotated. The blocks in the image are re-arranged in the same manner as in re-arrangement of pixels in each block upon rotation of the block, thereby rotating the image.

180° Rotation

FIG. 7 is a flow chart showing the sequence for performing 180° rotation processing of an image by the image processing apparatus according to the present invention.

Variables p_from and p_to are input and output pointers of a block to be processed. Variables row_from and row_to indicate the numbers of bytes in the horizontal direction before and after rotation, and a variable work is a work variable for the rotation processing. A variable rem1 stores a value for end processing, i.e., a shift amount when the end of an image does not match a 1-byte boundary. A variable rem2 stores a fixed value (32−rem1).

Step S71 corresponds to an initialization step, and initializes variables such as read and write pointers of a block to be processed. In this case, processing is performed in units of 4 bytes×1 line.

Step S72 corresponds to packing processing for reading out all data of a block to be processed, and storing the readout data in a region larger than a 1-byte length. The packed data are stored in the variable work. When the value of the variable rem1 is not 0, processing "work= (work>>rem1)|((uint32)p_from[0]<<rem2);" in step S72 is executed to adjust the end. This formula means that a value obtained by shifting the contents of the variable work to the right by the number of digits rem1 and a value obtained by converting a value indicated by the pointer p_from into a 32-bit value and shifting the converted value to the left by the number of digits rem2 are ORed. Although similar processing is required in the conventional processing, its description is omitted for the sake of simplicity. Note that the right shift arithmetic operation to be executed here is a logic shift arithmetic operation for filling 0 in blank digits obtained after the shift operation.

Step S73 corresponds to processing for sequentially generating rotated data based on the variable and writing the rotated data. Upon completion of step S73, the flow returns to step S71 to process the next block.

Figure 8:
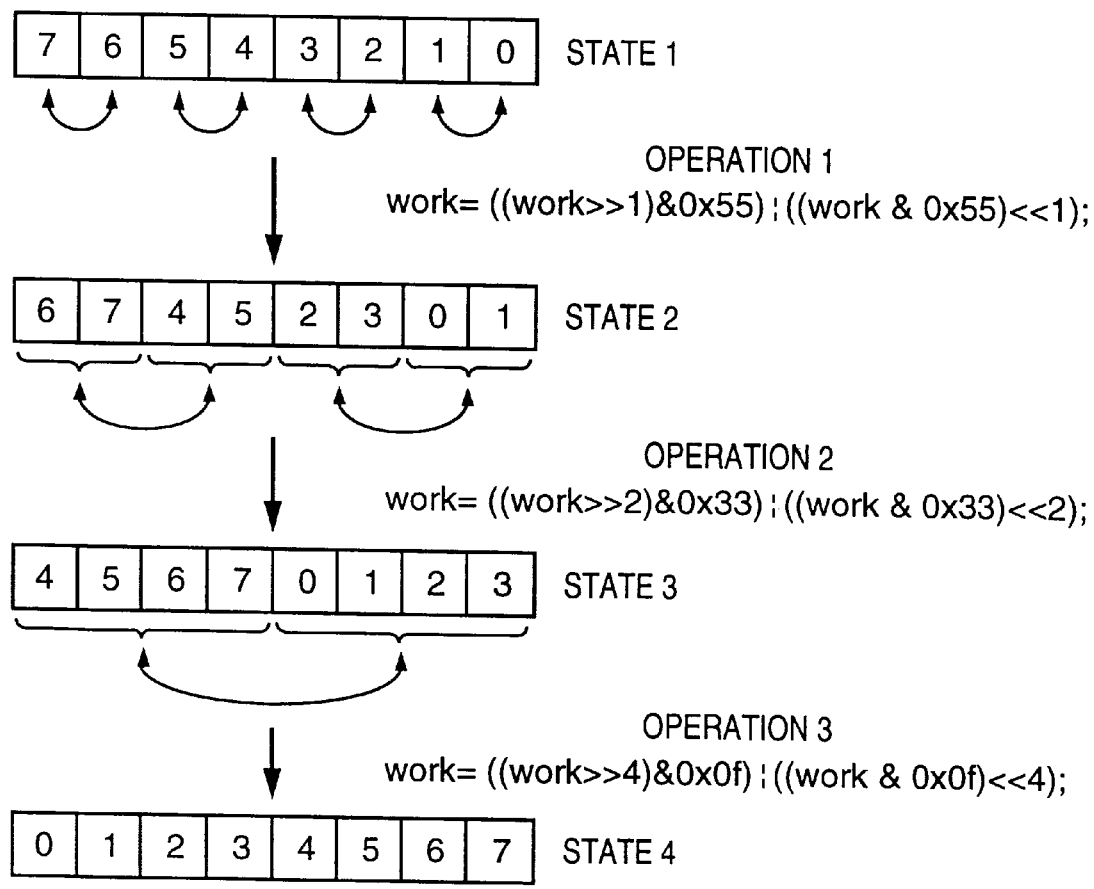
FIG. 8 is a view for explaining the 180° rotation processing of the second embodiment.

FIG. 8 is a view for explaining a macro "bitcombine2( )" in step S73 in FIG. 7. For the sake of simplicity, bit rotation of 1-byte data will be exemplified below. Bit data 7 to 0 are aligned in the variable work, as shown in state 1. By operation 1, pixel data 7 and 6, 5 and 4, 3 and 2, and 1 and 0 in the variable work are replaced with each other, and the variable work is set in state 2. By operation 2, the contents of the variable work are re-arranged, i.e., pixel data 6–7 and 4–5, and 2–3 and 0–1 are replaced with each other in units of 2 bits. As a result, the variable work is set in state 3. Finally, by operation 3, the contents of the variable work are re-arranged, i.e., pixel data 4–7 and 0–3 are replaced with each other in units of 4 bits. As a result, the variable work is set in state 4, and the rotation processing is completed. More specifically, since stepwise pixel replacement is performed at a plurality of positions in a single operation, high-speed processing is assured. Note that the same result is obtained independently of the order of operations 1 to 3. The variable work to be rotated is a 4-byte variable, and the upper- or lower-half 4 bytes of each block are packed in the variable work in step S72. Thus, in the processing in step S73, the operations shown in FIG. 8 are simultaneously performed for 4 bytes in the variable work.

Figure 6A:
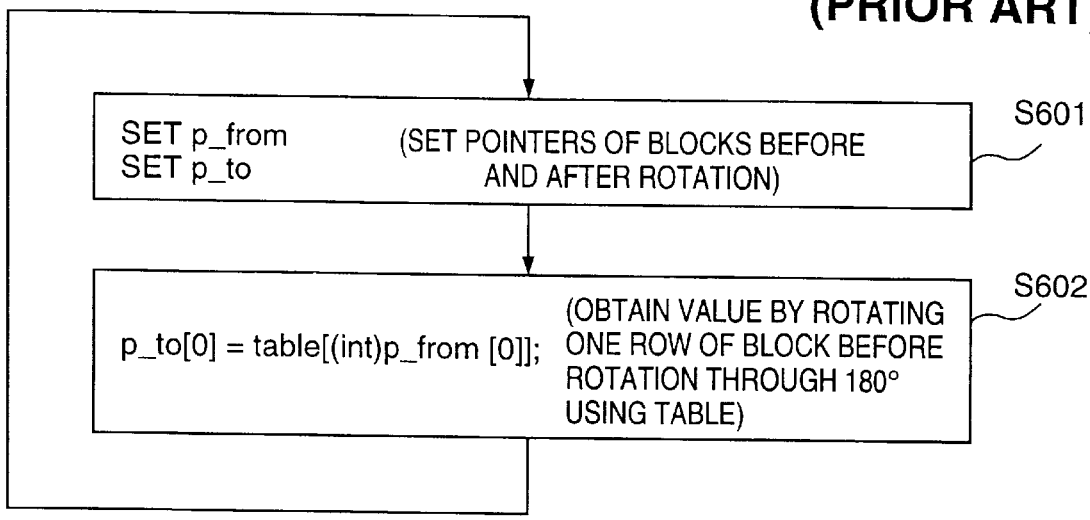
FIGS. 6A and 6B are flow charts showing the sequences of the conventional 180° rotation processing of a block.
Figure 6B:
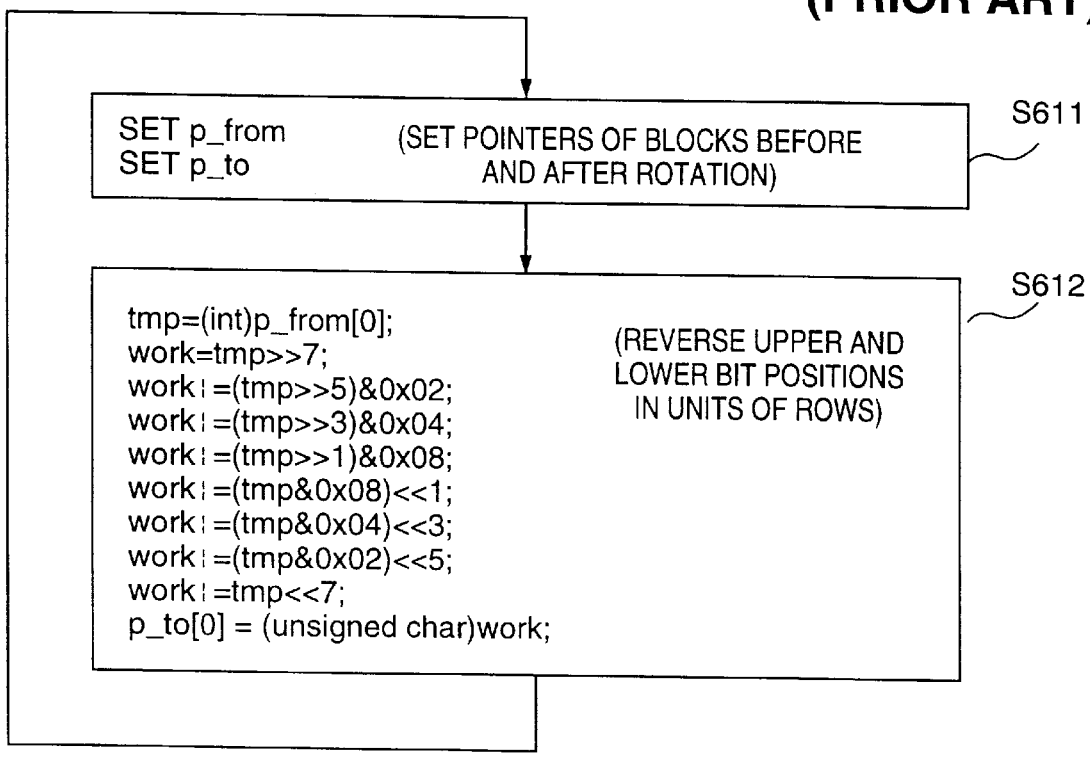

When this processing time is calculated in detail, each of operations 1 to 3 requires five arithmetic operations, i.e., a total of 15 arithmetic operations are required. Since the conventional method shown in FIG. 6B requires 21 arithmetic operations, only this fact assures higher-speed processing. Furthermore, in this embodiment, since the variable work stores 4 bytes and these bytes can be simultaneously subjected to processing, still higher-speed processing can be realized. In addition, since this algorithm does not make any extra data accesses unlike in an LUT, a decrease in speed is small even when this algorithm is executed by a system having no data cache. As can be seen from FIG. 8, in the 180° rotation processing, pixels can be replaced stepwise from small portions even when a plurality of byte data are not packed. For this reason, the packing processing is not always required.

FIG. 7 shows a case wherein data in one block consisting of 4 bytes×1 line are complete. When data are incomplete like a block at the end of an image, the following processing can be performed. When data in 4 bytes are incomplete, the processing in step S72 is performed while portions corresponding to omitted bits in the variable work are filled with blank bits. In step S73, the same applies to the macro "bitcombine2( )", and the control may be made to write only effective portions of data.

Figure 17:
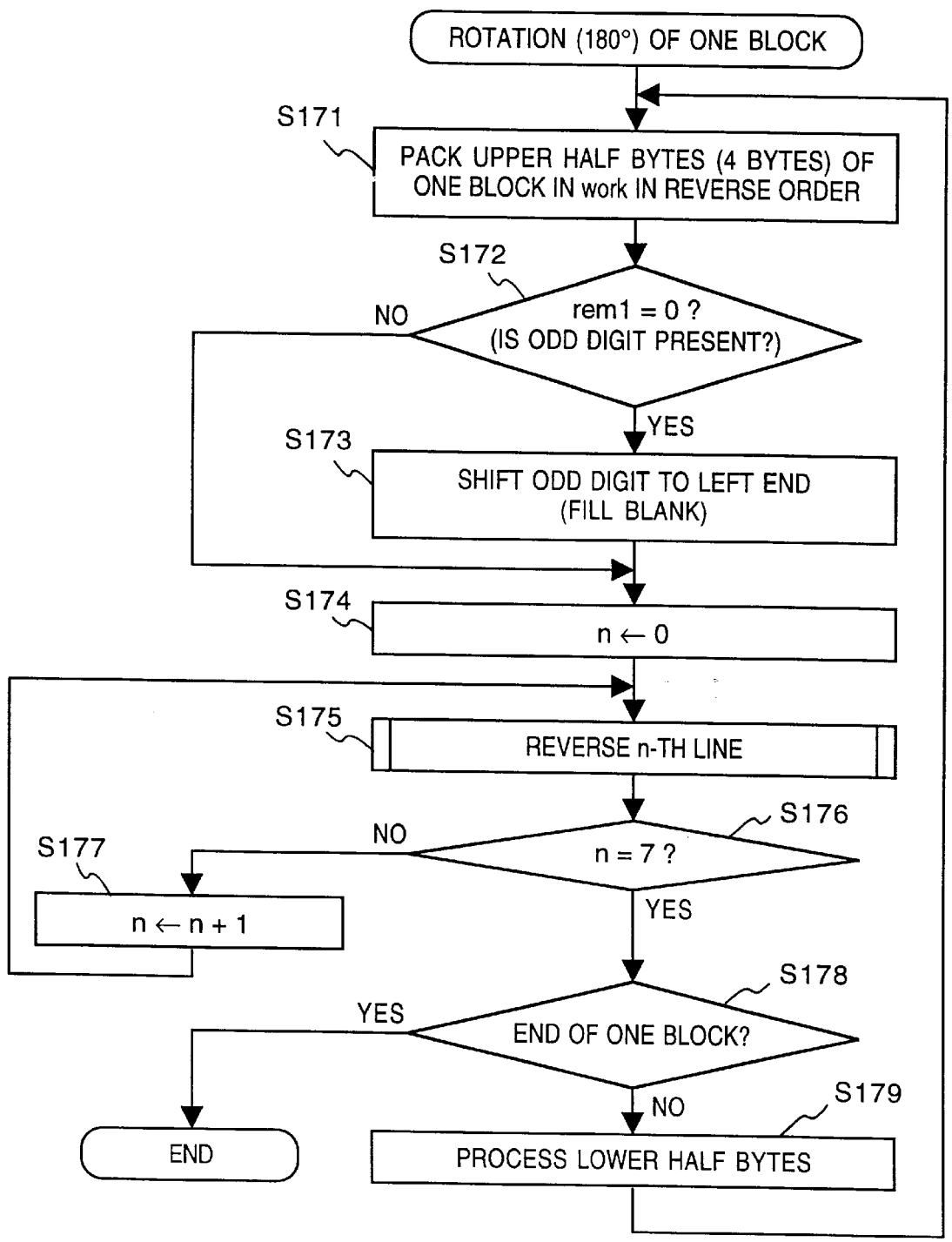
FIG. 17 is a flow chart showing the 180° rotation processing sequence according to the second embodiment of the present invention.
Figure 18:
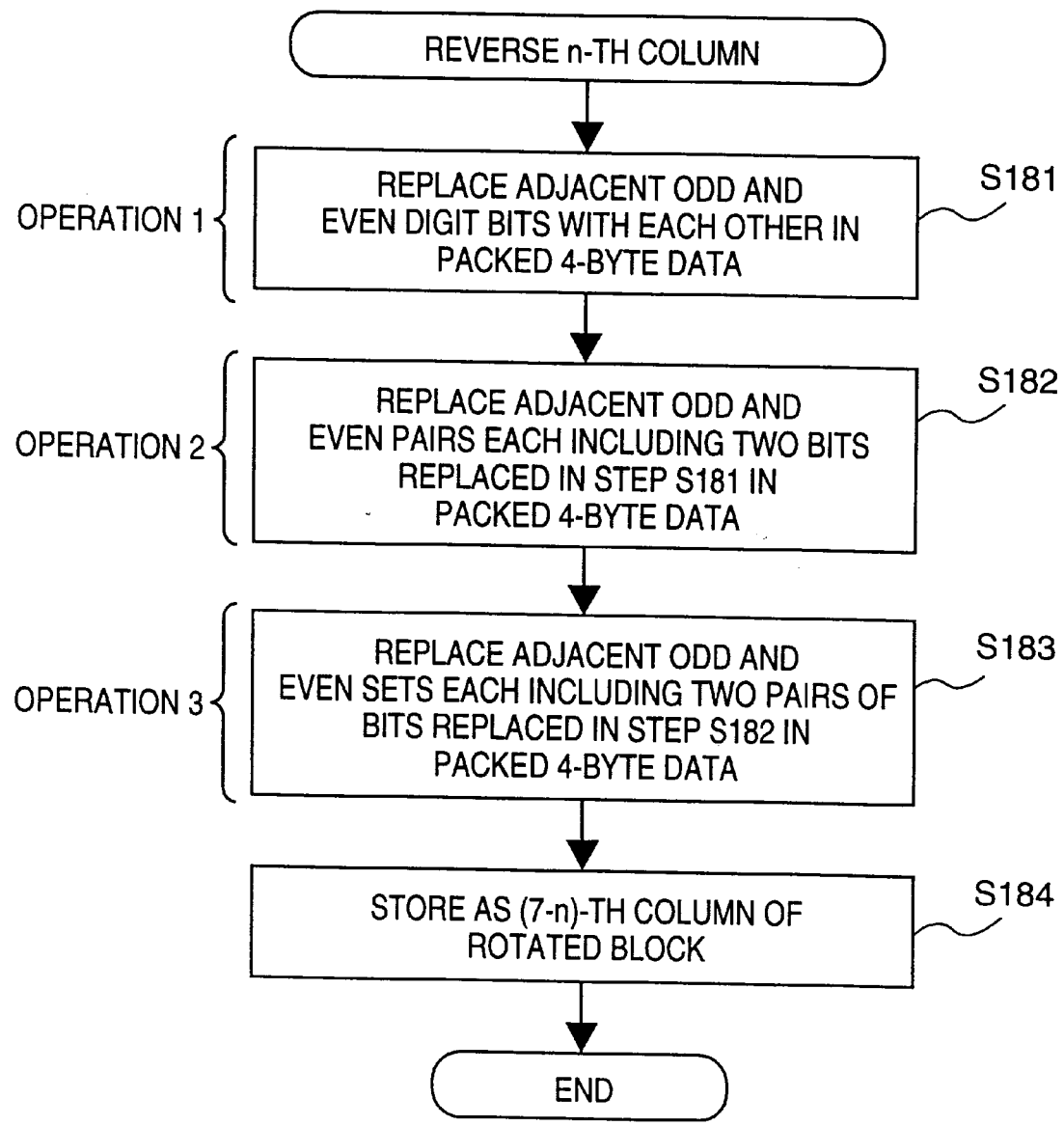
FIG. 18 is a flow chart showing the 180° rotation processing sequence according to the second embodiment of the present invention.

FIG. 17 is a flow chart for explaining in more detail the processing shown in FIG. 7. FIG. 18 is a flow chart for explaining the macro bitcombine in FIG. 7. The CPU 1 can realize 180° rotation of an image by executing the programs corresponding to the sequences of the flow charts shown in FIGS. 17 and 18.

Referring to FIG. 17, the upper-half 4 bytes of an 8×8 block to be rotated are packed in the variable work (S171). If the block to be processed is an incomplete block, incomplete portions are filled with blank bits (S173). Then, the upper and lower digits of an n-th line in the block are reversed (S175). This processing is shown in FIG. 18, i.e., corresponds to the processing itself shown in FIG. 8. The processing in step S175 is performed for four lines packed in the variable work. Upon completion of the upper four lines, the same processing is repeated for the lower four lines from step S171 (S179), thus completing 180° rotation of one block.

Referring to FIG. 18, adjacent odd and even digits of the packed four bytes are replaced with each other in step S181 (operation 1), and adjacent odd and even pairs of replaced bits are replaced with each other in step S182 (operation 2). In step S183, adjacent odd and even sets of four bits including the pairs of bits replaced in step S182 are replaced with each other (operation 3). In this manner, replacement of the upper and lower digits of the packed four bytes is completed. When the n-th line in this non-rotated block is stored as a (7−n)-th line in a rotated block, rotation of the first line is completed.

As described above, the 180° rotation processing of an image can be performed at high speed.

90° Rotation When Bit 0 is on Left

Figure 2B:
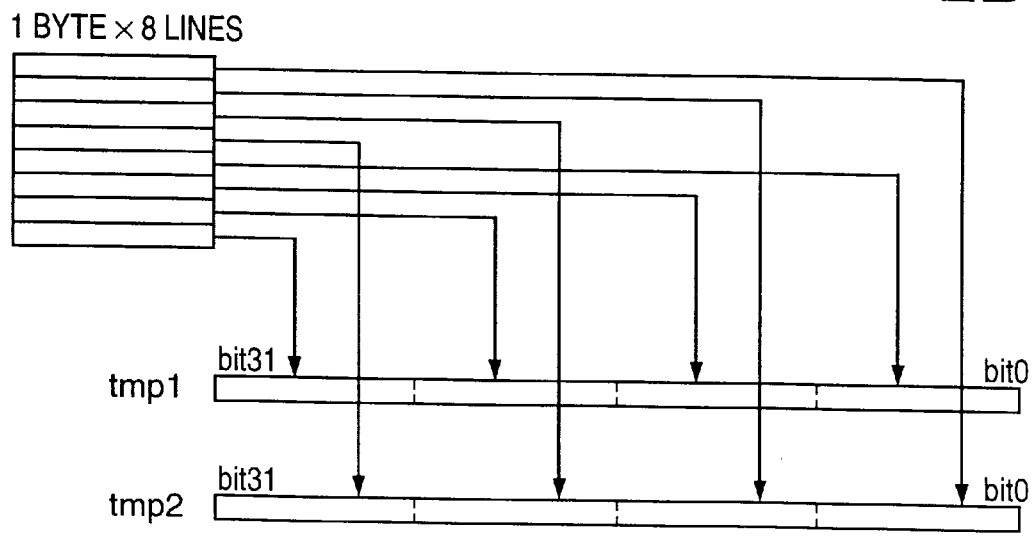

The first embodiment has exemplified the 90° rotation when bit 7 corresponds to a left pixel. This embodiment exemplifies a case wherein bit 0 corresponds to a left pixel. FIG. 9 shows the sequence in this case. The operation is substantially the same as the processing in the first embodiment. However, in the processing in step, S92, the packing method of data is reversed, as shown in FIG. 2B, and the order of lines converted from columns to rows by the macro "bitcombine( )" in step S13 in FIG. 1 is reversed. More specifically, in the processing shown in FIG. 1, since the LSB corresponds to the rightmost digit, the rotation is performed so that the LSBs are aligned in the first line. However, in FIG. 9, since the leftmost digit corresponds to the LSB, a line is formed by reading out pixel data in the leftmost digits in an order opposite to FIG. 3, and this line is determined to be the first line.

In this manner, even when bit 0 is at the left end, the 90° rotation processing can be similarly performed.

270° Rotation

When an image is rotated through 270°, the same sequence as in FIG. 9 is executed when bit 7 corresponds to a left pixel, and the same sequence as in FIG. 1 is executed when bit 0 corresponds to a left pixel. Only a difference from the 90° rotation is the order of blocks to be processed in initialization of pointers in step S11 or S91. As can be seen from the above description, in the processing operations shown in FIGS. 1 and 9, the rotation directions are opposite to each other in consideration of only the arrangement order of bits. That is, in FIGS. 1 and 9, both the variables p_from and p_to are set to indicate the first line of a block in the initialization step. However, in the case of 270° rotation, one of the variables p_from and p_to is set to indicate the last line. The pointer set to indicate the last line is incremented toward the first line of the block.

90° Rotation Accelerated by 64-bit Arithmetic Operation

Figure 10:
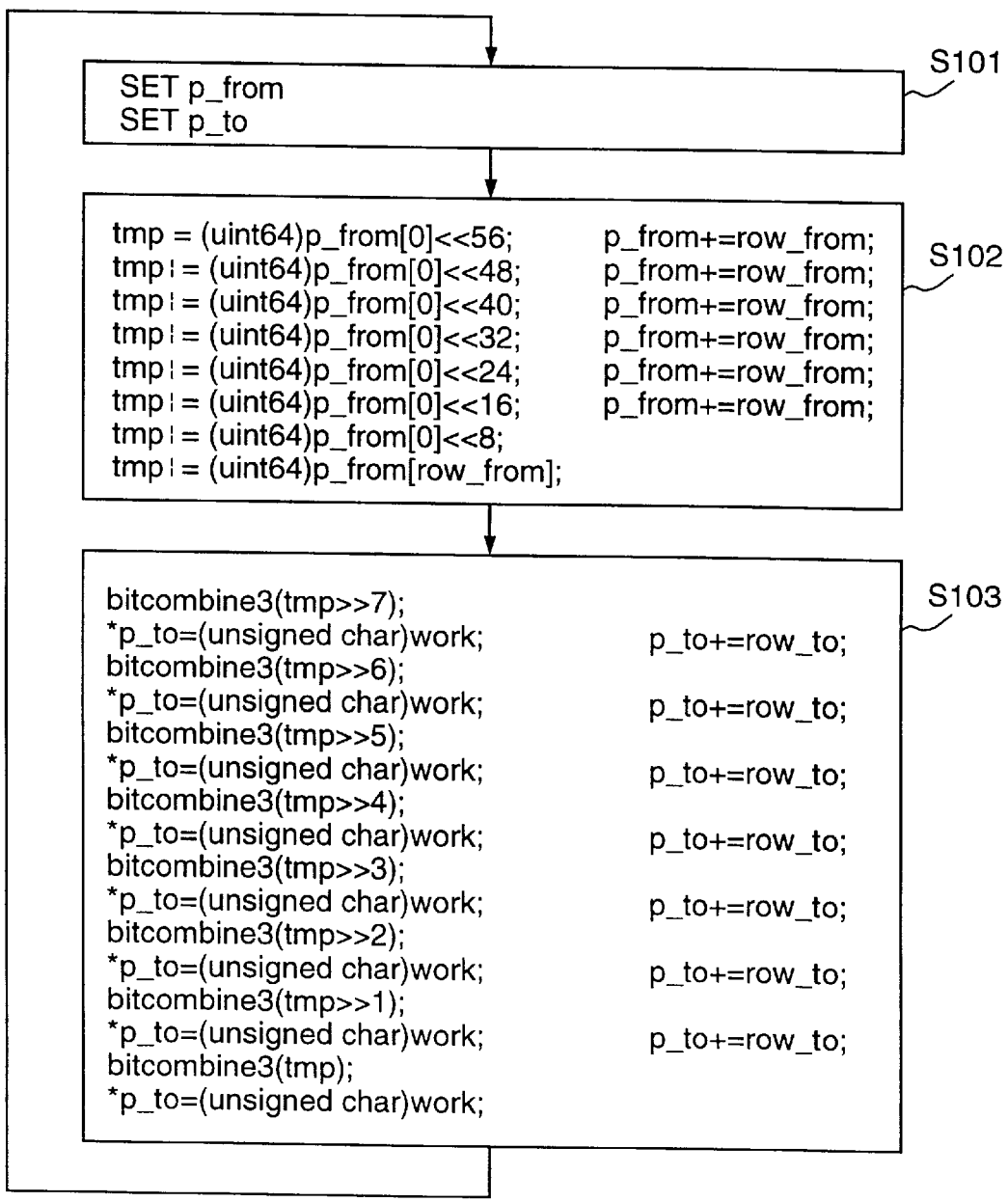
FIG. 10 is a flow chart showing the processing sequence executed when the processing of the first embodiment is executed by a 64-bit processor.

The first embodiment uses 32-bit arithmetic operations. FIG. 10 shows an example when a processor that can perform 64-bit arithmetic operations is used. Note that uint64 is an 8-byte length integer and is assumed to be defined beforehand.

This processing is essentially the same as that described above with reference to FIG. 3 or FIGS. 15 and 16. However, since 64 bits can be parallelly processed, tmp1 and tmp2 shown in FIG. 3 can be set in a single variable work. More specifically, in state 1 in FIG. 3, the upper and lower 4 bytes of a block are divisionally packed in two 4-byte variables. Alternatively, in step S102 in FIG. 10, 8 bytes for one block are packed in a single variable. That is, since tmp1 and tmp2 correspond to the continuous variable work in FIG. 10, a value obtained by shifting the contents of the variable work to the right by 32 digits (4 bytes) corresponds to the variable tmp1. Therefore, operation 1 in FIG. 3 corresponds to an operation for shifting the upper 32 bits of the variable work by 4 digits and ORing the shifted value and the lower 32 bits (including processing for masking digits not to be processed).

As described above, in the first embodiment, the number of arithmetic operations in the micro "bitcombine3( )" is 8 or 9. However, in FIG. 10 of this embodiment, since the processing of operation 1 in FIG. 3 can be attained by only the shift operation and ORing, the number of arithmetic operations can be further reduced to 7 or 8.

As described above, the conventional algorithm has no room for a higher processing speed even when the processor evolves, since it performs processing in units of 8 bits irrespective of the number of digits to be parallelly processed of the processor. However, according to the present invention, higher-speed processing can be realized in correspondence with evolution of the processor.

In this embodiment, the variables tmp1, tmp2, mask1, and mask2 required in the first embodiment can be reduced to two variables, i.e., tmp and mask. A portion "work|=work>>28;work|=14;work|=work>>7;" of the macro "bitcombine3( )" in FIG. 10 yields the same processing result as in FIG. 1 although its order is opposite to that in FIG. 1. More specifically, the processing in "work|=work>>28;work|=14;work|=work>>7;" correspond to operations 1 to 3 for shifting and superposing digits described above with reference to FIG. 3, but the same result is obtained even when these operations are executed in a reverse order.

Second Embodiment
Multi-value Image Rotation

Figure 11:
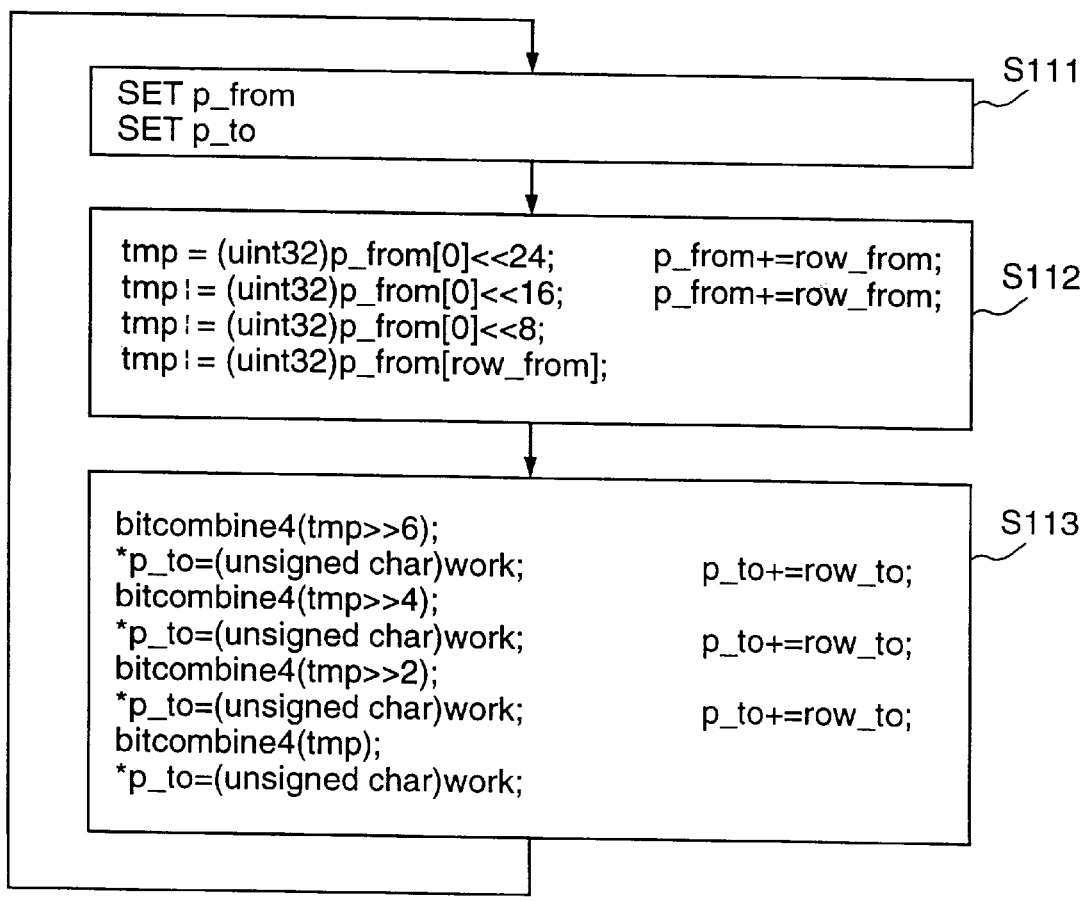
FIG. 11 is a flow chart showing the sequence of the 90° rotation processing of a block in which one pixel is expressed by 2 bits, according to the fifth embodiment of the present invention.
Figure 19:
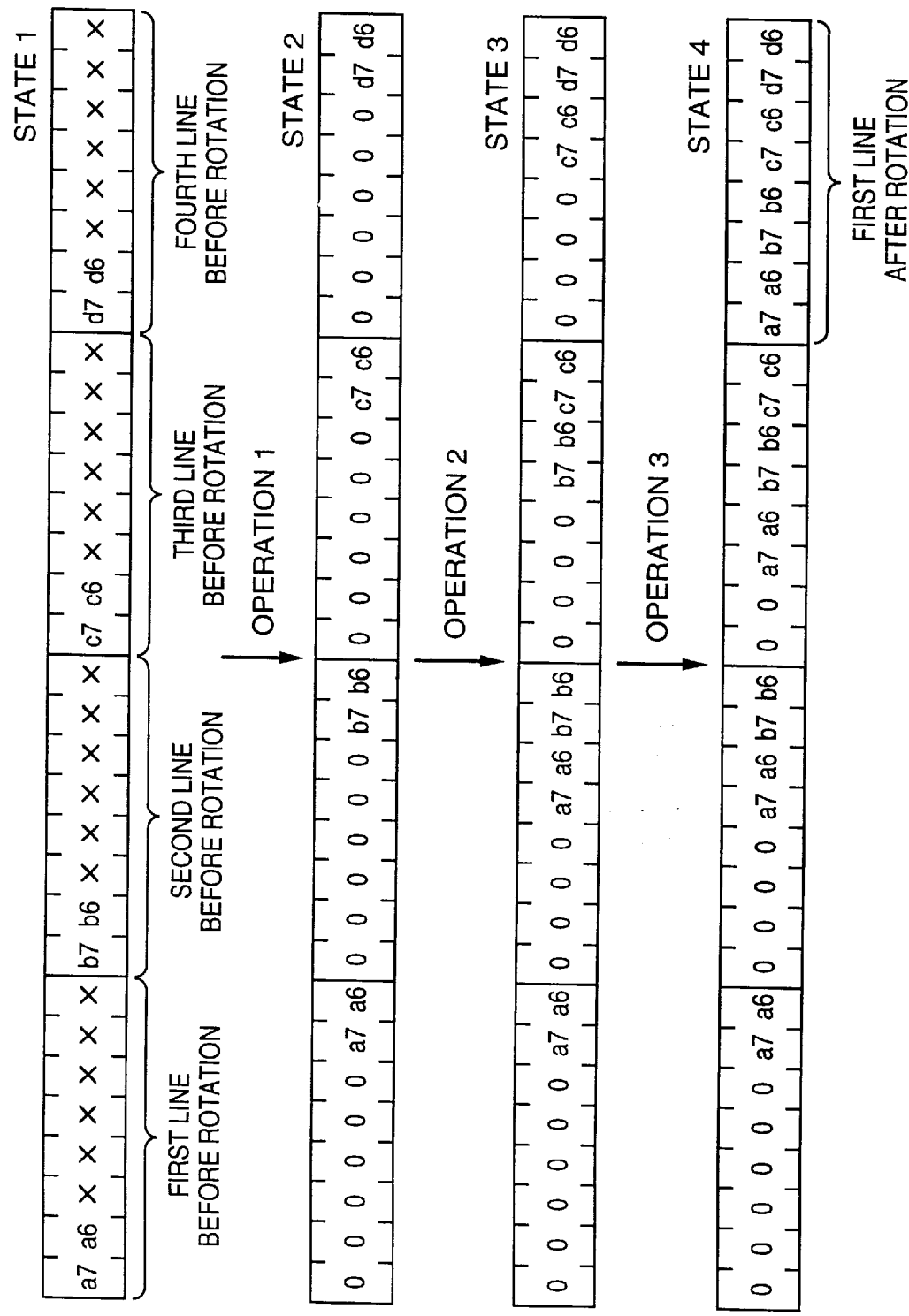
FIG. 19 is a view showing the state wherein a block in which one pixel is expressed by 2 bits is rotated through 90° according to the fifth embodiment of the present invention.

FIG. 11 shows the processing method of 90° rotation when one pixel is expressed by 2 bits. In this embodiment, processing is performed in units of blocks each consisting of 1 byte×4 lines, and the rotation processing described above as the first embodiment is performed in units of 2 bits. More specifically, in step S112, 32 bytes for 4 lines are packed in a single variable tmp. FIG. 19 is a view showing the rotation processing for one line, in which the first rotated line is formed in step S113 in FIG. 11. By the processing in step S112, data are packed in the variable tmp, as shown in state 1 in FIG. 19. Thereafter, the contents of the variable tmp are shifted to the right by 6 digits to mask digits other than two digits at the end of each byte with 0 (operation 1). The reason why the contents of tmp are shifted by 6 digits is that the upper 2 bits of each byte are to be processed. In this case, if the lowermost 2 bits of each byte are to be processed, no shift operation is required. On the other hand, if next lower 2 bits of each byte are to be processed, the contents of tmp are shifted to the right by 2 digits. Furthermore, if the still next lower 2 bits of each byte are to be processed, the contents of tmp are shifted to the right by 4 digits. In this manner, data set in state 2 are obtained. This state remains the same independently of the line number.

Subsequently, the data in state 2 are shifted to the right by 6 digits, and the shifted data and the data in state 2 are ORed (operation 2), thus obtaining data in state 3. Furthermore, the data in state 3 are shifted to the right by 12 digits, and the shifted data and the data in state 3 are ORed (operation 3), thus obtaining data in state 4. The lowermost one byte of the data in state 4 corresponds to one rotated line.

The above-mentioned operations are performed for all the four lines, and the obtained lines are stored as lines corresponding to digits before processing, thus obtaining 90° rotated image data. In FIG. 19, a block. is rotated so that upper digits form upper lines, and lower digits form lower lines. As described above, although the basically the same processing as in the first embodiment is performed, the number of digits to be operated is not 1 bit but 2 bits unlike in the first embodiment.

As described above, the present invention can also be applied to a multi-value image.

Third Embodiment
Processing for a Plurality of Lines

FIG. 12 shows the processing method of 90° rotation when one pixel is expressed by 2 bits. Using the same variables tmp1 and tmp2 as in FIG. 1, processing "tmp1|=tmp1<<14;tmp2|=tmp2<<14" is performed in step S122 to prevent identical arithmetic operations from being repeated in step S123. As a result, rotated data for two lines are generated in the variable work in a macro "bitcombine5( )".

Figure 20:
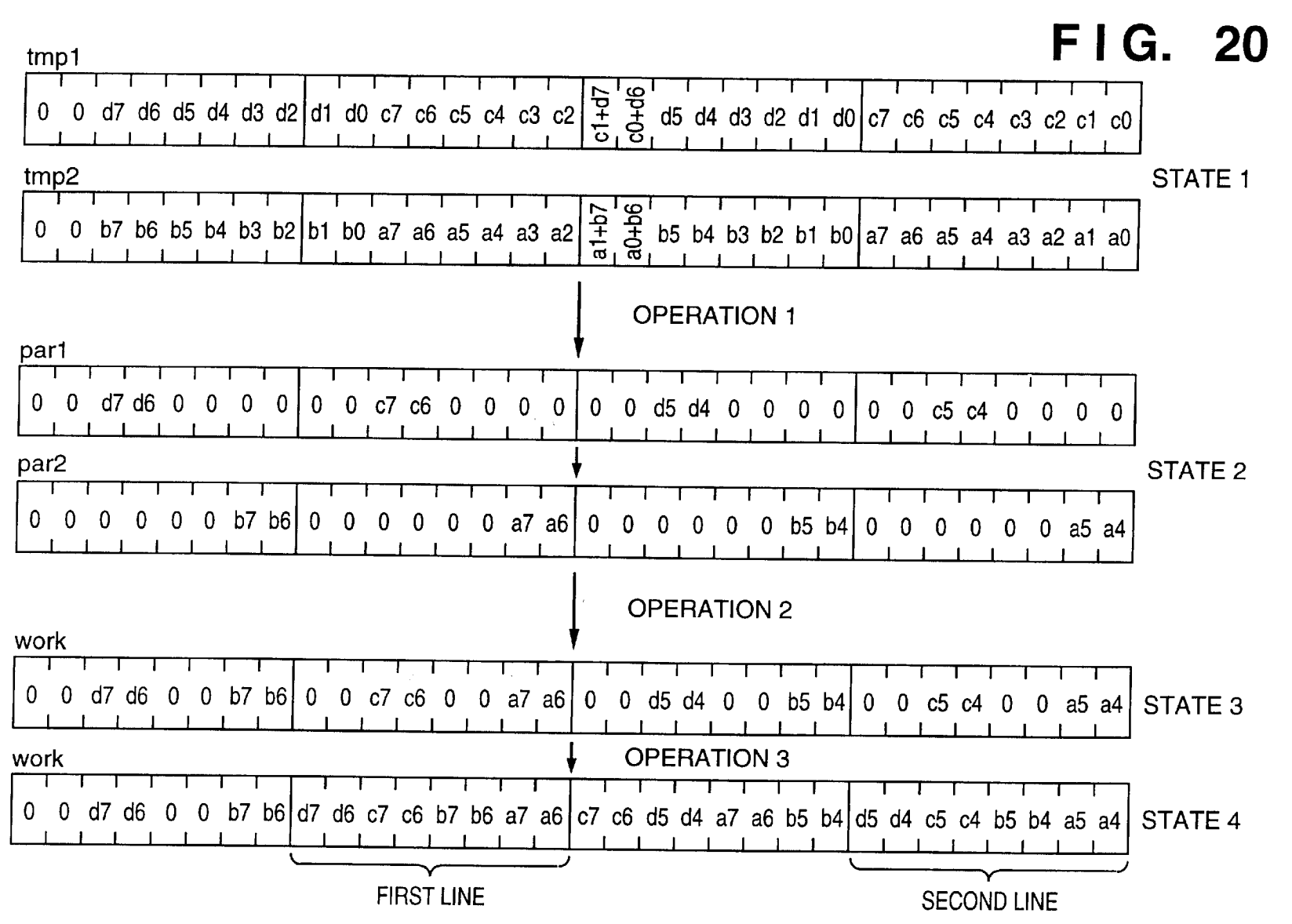

FIG. 20 shows this state. In step S122, as shown in state 1, data of the first line (indicated by symbol a) and the second line (indicated by symbol b) of a non-rotated block are set in the variable tmp2. More specifically, the second and first lines are stored in turn in the lower 16 bytes of tmp2 (0 is set in other digits), and the OR of the stored value and a value obtained by shifting the stored value to the left by 14bits is stored in the variable tmp2. The variable tmp1 similarly stores data of the third and fourth lines.

For the variables in state 1, the value of tmp2 is shifted to the right by 4 digits to set 0 in bits other than the lower 2 bits of each byte, and 0 is set in bits other than the third and fourth bits from the MSB of each byte in the value of tmp1 (operation 1). These values are respectively stored in variables par2 and par1. The values of the variables tmp1 and tmp2 preferably remain the same for the subsequent processing.

The values in state 2 obtained in this manner are ORed (operation 2) to obtain a value in state 3. When the value in state 3 and a value obtained by shifting the value in state 3 to the right by 6 digits are ORed (operation 3), a value in state 4 is obtained.

In state 4, two lines after the non-rotated block is rotated through 90° in units of 2 bits are obtained. More specifically, the first line is obtained as the second byte, and the second line is obtained as the fourth byte.

The above-mentioned operations are also performed for the third and fourth rotated lines. For this purpose, as two values to be given in state 2, values that are respectively shifted to the left by 4 digits from those shown in FIG. 20 are used; bits 3 and 2 or bits 1 and 0 respectively replace bits 7 and 6 or bits 5 and 4 shown in FIG. 20. As a result, after operations 2 and 3, the third and fourth rotated lines are obtained.

Fourth Embodiment
Processing for a Plurality of Blocks

Figure 13:
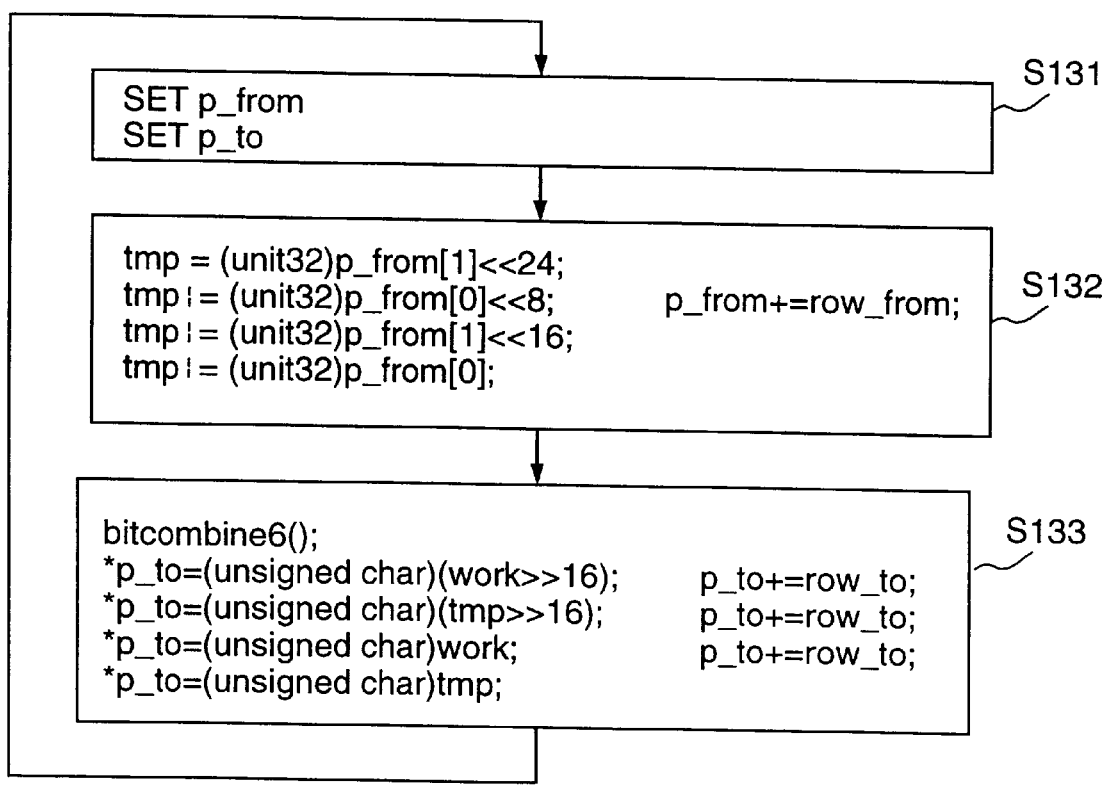
FIG. 13 is a flow chart showing the processing sequence executed when a plurality of blocks are simultaneously processed according to the seventh embodiment of the present invention.

FIG. 13 shows the processing method of 90° rotation when one pixel is expressed by 4 bits. According to the first embodiment, when one pixel is expressed by 4 bits, one block consists of 1 byte×2 lines. However, in this state, if such a block is packed in a 32-bit variable, a blank portion is formed for 2 bytes, and 1/2 of the arithmetic operations are wasted. For this reason, processing is performed while 2 bytes×2 lines for two blocks are packed in a variable tmp. This packing processing is performed in step S132. In step S132, data are packed in the 4-byte variable tmp in the order of the first line of the second block, the second line of the second block, the first line of the first block, and the second line of the first block.

FIG. 21 shows this state. In two blocks A and B in which one pixel is expressed by 4 bits, pixels a1 to a4 and pixels b1 to b4 are defined as shown in FIG. 21. These pixels are packed in step S132, as shown in state 1. The packed data are stored in units of pixels (4 bits) in the 32-bit variable tmp from its LSB side by operation 1. Similarly, pixels which are not stored in tmp are shifted to the right by four digits and are stored in "work"(operation 1). As a result, state 2 shown in FIG. 21 is obtained. The value of the variable tmp obtained as described above, and a value obtained by shifting the value of temp to the right by 4 digits are ORed, and the OR result is stored in the variable tmp (operation 2). The same operation is performed for the variable "work". The obtained two variables in state 3 are stored as two rotated blocks in the order of the second byte of "work" the second byte of tmp, the fourth byte of "works", and the fourth byte of tmp, thus obtaining an image in which blocks A and B are simultaneously rotated through 90°.

With the above-mentioned processing, since the total number of arithmetic operations and the number of loops can be reduced, high-speed processing can be assured. When a plurality of variables for packing are prepared, the number of loops can be further reduced.

If a processor that can perform 64-bit arithmetic operations is used, it can double the number of blocks to be processed. For example, not only in a case wherein one pixel is expressed by 4 bits, but also in a case wherein one pixel is expressed by 2 bits, as shown in FIG. 11, it is easy to modify processing so as to simultaneously process two blocks.

As described above, according to the image processing method and apparatus of the present invention, the following effects are expected.

Since data on a bitmap across a plurality of bytes are simultaneously stored in a multi-byte length variable, a plurality of bytes can be simultaneously processed, and the number of times of arithmetic operations can be reduced. For this reason, since a plurality of pixels can be simultaneously processed, the number of times of arithmetic operations per pixel can be reduced, and the processing time can be shortened.

In the prior art, even when a 64-bit process replaces a 32-bit processor to execute the processing, the processing speed cannot be increased unless the operation frequency or cache contents are changed or the internal architecture is improved. However, according to the present invention, when the bit width of an arithmetic operation increases, higher-speed processing can be realized by positively utilizing the increase in bit width. For this reason, a difference from the prior art can be further increased.

Since the number of times of data accesses is small, a decrease in speed is small even in a system with a small data cache. For the same reason, a decrease in speed is small even in a system having no data cache.

Since blocks are processed in the order in which the addresses of an original image to be rotated continue, the cache hit rate can be increased with respect to the same capacity of the data cache, thus increasing the processing speed.

Since image data across a plurality of bytes are simultaneously stored in a multi-byte length variable, the number of variables can be reduced as compared to a case wherein data are divisionally stored in a plurality of variables. For this reason, a compiler can easily distribute variables to register variables.

Fifth Embodiment

The fifth embodiment of the present invention will be described below with reference to the accompanying drawings.

In the following description of the embodiment, the present invention is applied to an electronic filing apparatus.

Figure 22:
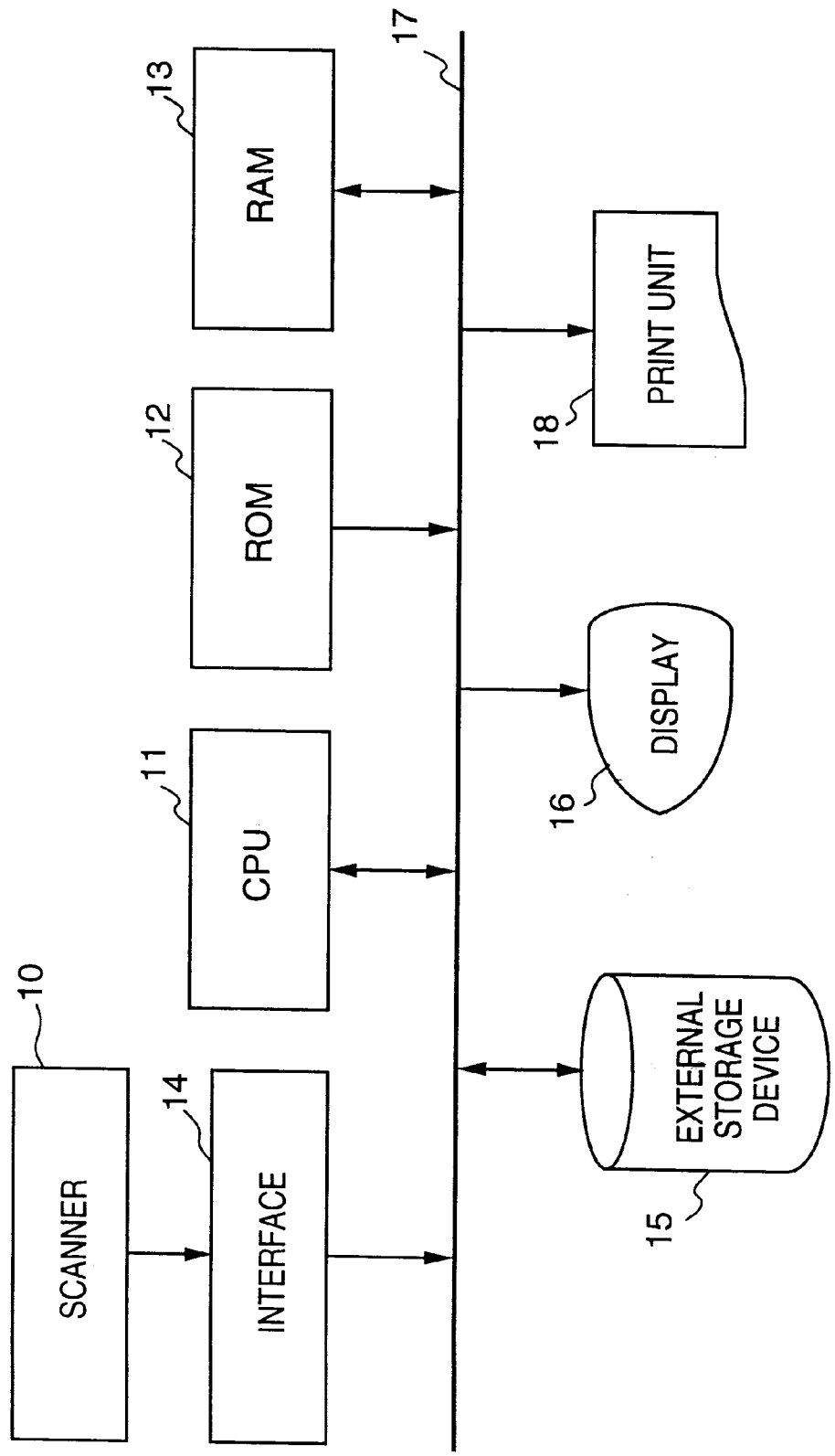
FIG. 22 is a block diagram showing the arrangement of an electronic filing apparatus according to an embodiment of the present invention.

FIG. 22 is a block diagram showing the arrangement of an electronic filing apparatus according to this embodiment. Referring to FIG. 22, a scanner 10 optically reads an original image set on the apparatus to obtain image data. A CPU 11 controls the overall electronic filing apparatus. A ROM 12 stores various control programs to be executed by the CPU 11, data to be looked up in various kinds of processing, and the like. A RAM 13 presents a work memory area for the CPU 11. Also, the RAM 13 stores image data of a document for one page upon discrimination of the original direction (to be described later). An interface 14 connects the scanner 10 and a bus 17.

An external storage device 15 stores document image data to be filed. A display 16 makes various display operations. For example, document image data stored in the external storage device 15 is read out, and the readout data can be displayed on the display 16. A print unit 18 forms a visible image on a recording medium. For example, the print unit 18 can form a document image stored in the external storage device 15 on a recording sheet.

The operation of the electronic filing apparatus of this embodiment with the above arrangement will be described below.

Figure 23:
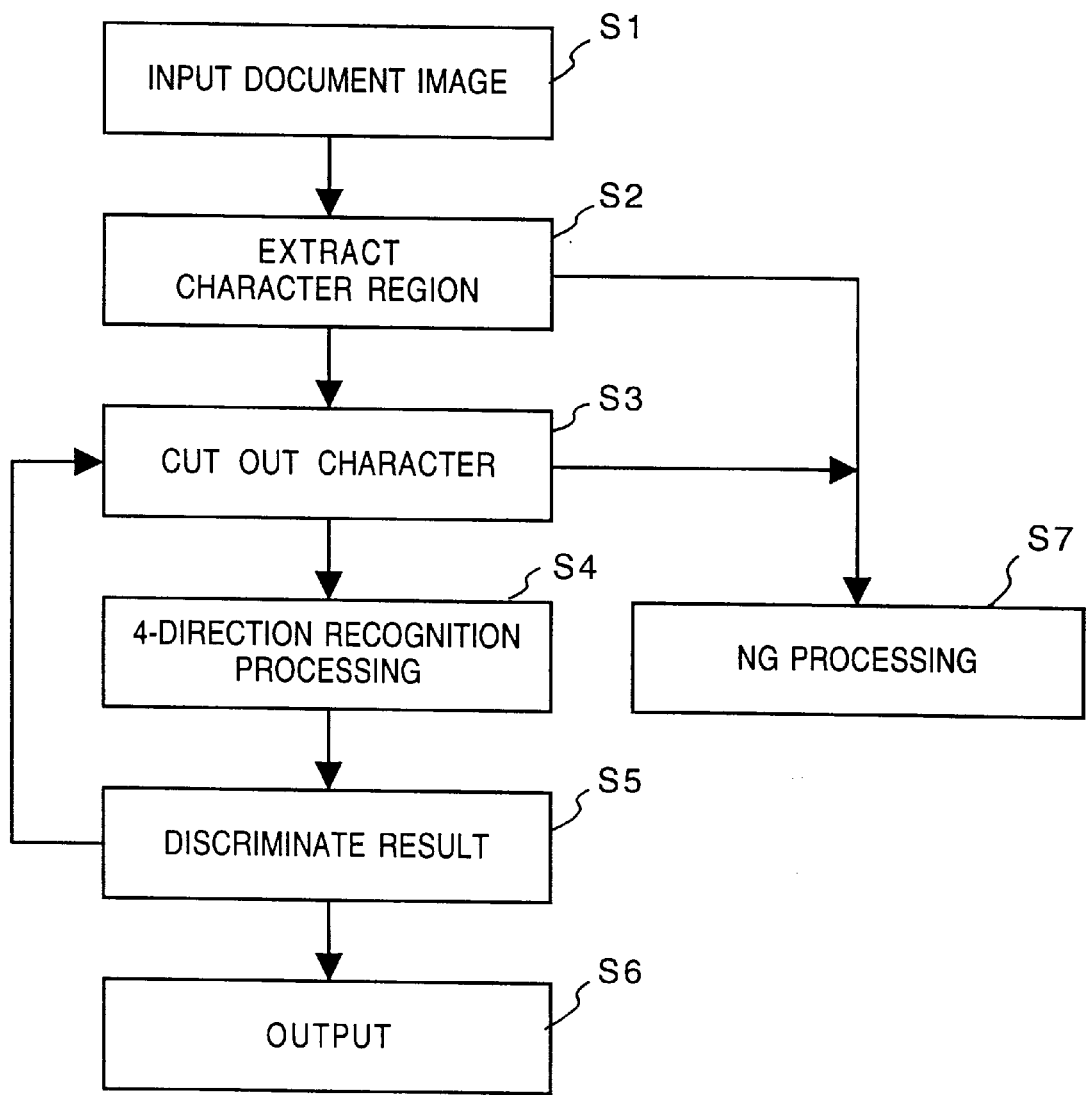
FIG. 23 is a flow chart showing the operation sequence of the electronic filing apparatus according to the embodiment shown in FIG. 22.

FIG. 23 is a flow chart showing the operation sequence of the electronic filing apparatus of this embodiment.

In step S1, the scanner 10 reads a document image, and stores it in the RAM 13 as image data whose document direction is to be discriminated. In step S2, character regions are extracted from the image data stored in the RAM 13. In step S3, one of the character regions extracted in step S2 is selected, and a character is cut out from the selected character region. The character cut-out processing is temporarily completed when the number of cut-out character regions has reached a predetermined value. As will be described later, the number of characters increases/decreases after recognition processing. For this reason, the number of characters to be cut out in step S3 is determined based on experience so that the final number of characters becomes equal to or larger than a threshold value. Note that extraction of character regions and cut-out processing of characters can adopt the state-of-art techniques in, e.g., character recognition techniques.

In step S4, recognition processing is performed for cut-out characters in four directions, i.e., 0°, 90°, 180°, and 270°, and average similarities in these directions are calculated. In step S5, a direction having the highest average similarity is determined as the direction of the original of interest. In step S6, the image data stored in the RAM 13 is rotated as needed on the basis of the direction of the original determined in step S5, and the data is saved in the external storage device 15 as image filing data.

On the other hand, if no character regions are extracted in step S2, the direction detection of an image according to this embodiment cannot be performed. In this case, the flow advances to step S7, and the image data stored in the RAM 13 is saved in the external storage device 15 as electronic filing data without any processing. If a predetermined number of character regions cannot be cut out in step S3, the respective threshold values used for determining the direction (to be described later) may be set to be relatively higher to perform direction detection.

The processing operations in steps S3, S4, S5, and S6 described above will be described in more detail below.

Figure 24:
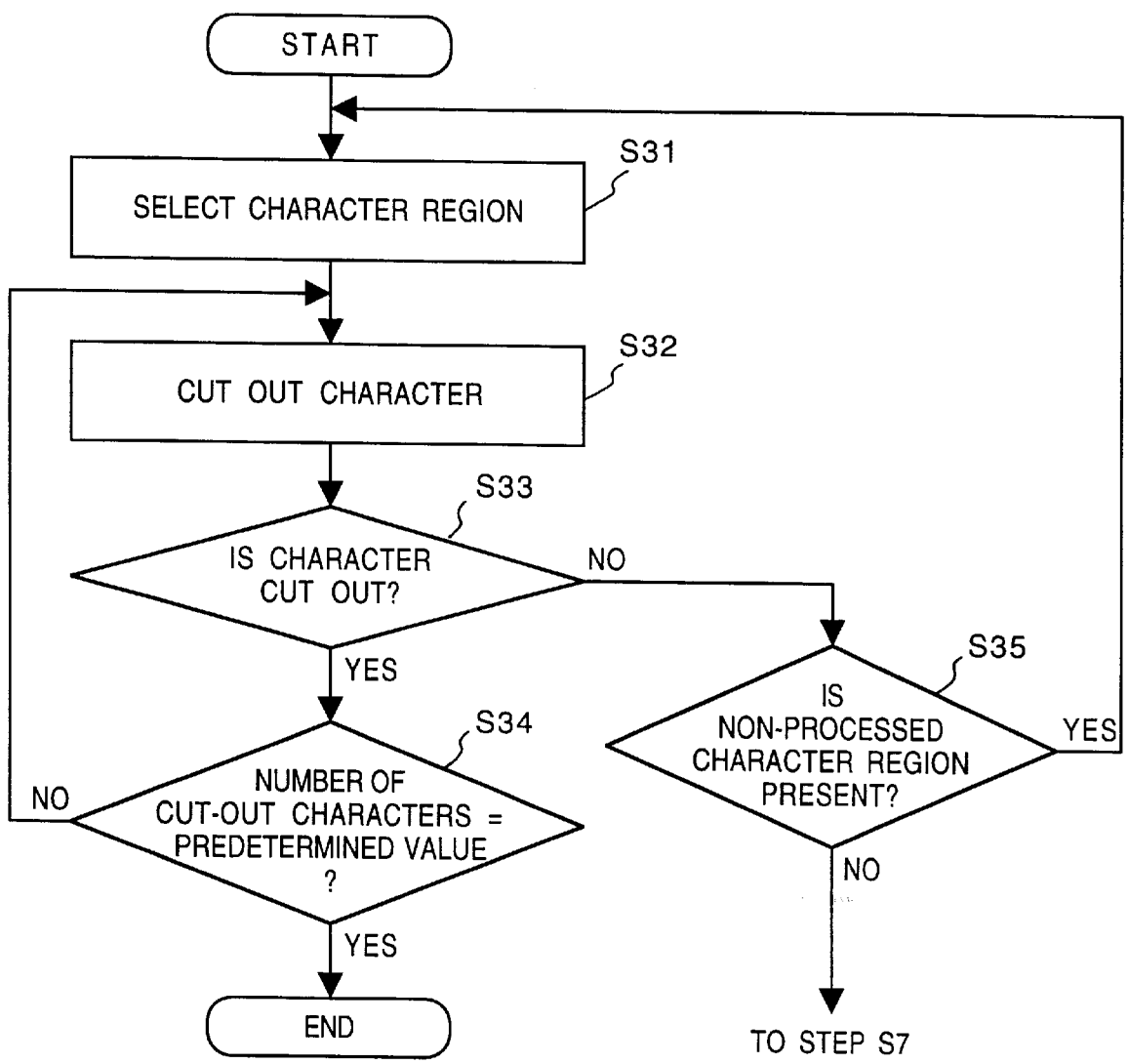
FIG. 24 is a flow chart showing the sequence of the character cut-out processing (step S3) in the embodiment shown in FIG. 22.

FIG. 24 is a flow chart showing the sequence of the character cut-out processing (step S3) in this embodiment.

In the character cut-out processing, in step S31, one of the character regions extracted in step S2 is selected. In step S32, a character is cut out from the selected character region. If a character can be cut out, the flow advances from step S33 to step S34 to check if the number of cut-out characters has reached a predetermined value. When a predetermined number of characters have been cut out, this processing ends. However, if the number of cut-out characters is smaller than the predetermined value, the flow returns to step S32.

If no character is cut out in step S32, the flow advances from step S33 to step S35 to check if non-processed character regions (non-selected character regions) remain. If non-processed character regions remain, the flow returns to step S31, and a new character region is selected. Thereafter, the flow advances to step S32.

As described above, the processing is repeated until a predetermined number of characters are cut out. In this case, when all the character regions are processed before a predetermined number of characters are cut out, the flow advances from step S35 to step S7 in FIG. 23.

Figure 25:
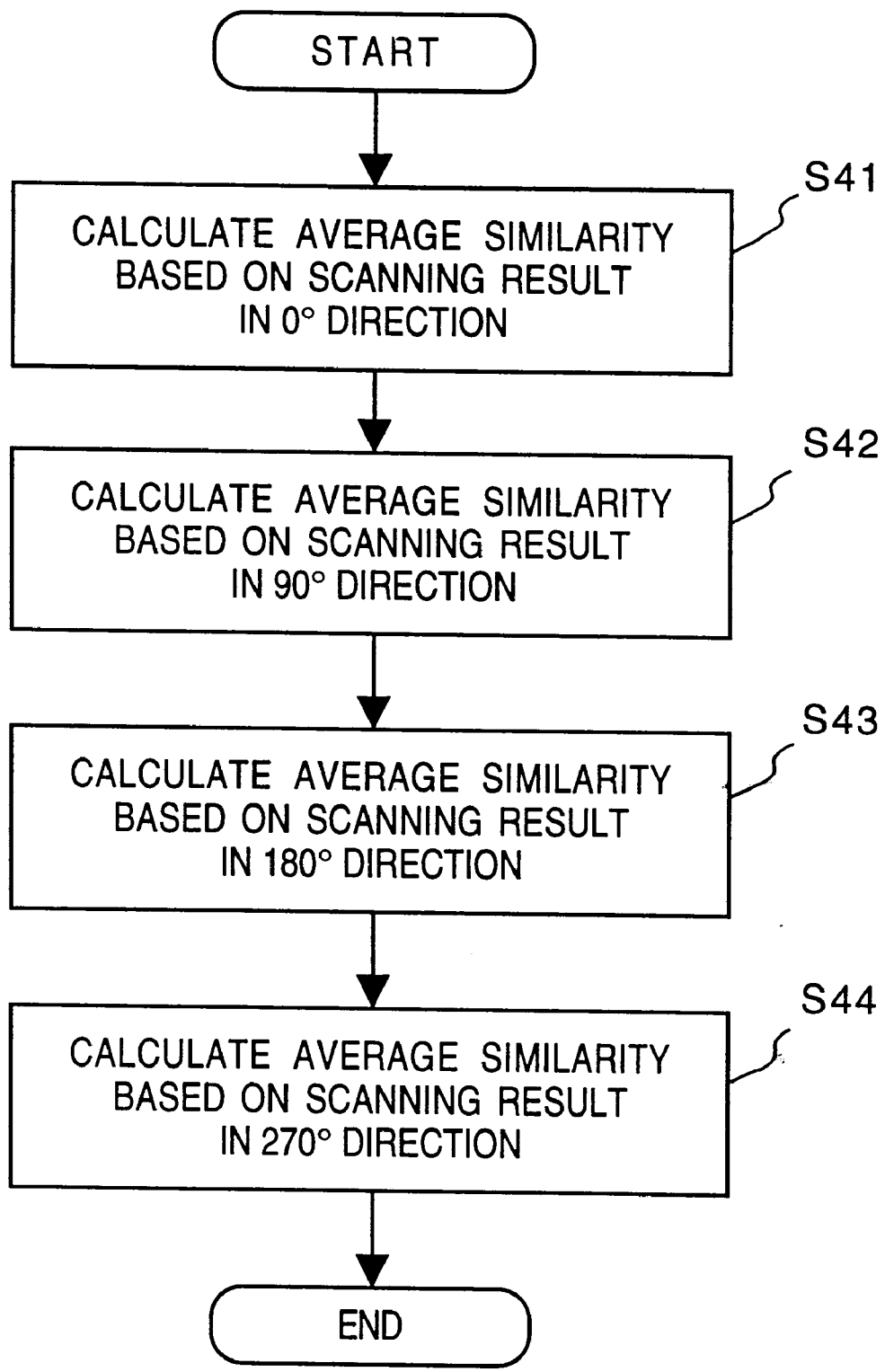
FIG. 25 is a flow chart showing the sequence of the four-direction recognition processing in the embodiment shown in FIG. 22.

Then, the four-direction recognition processing (step S4) will be described below. FIG. 25 is a flow chart showing the sequence of the four-direction recognition processing in this embodiment.

In step S41, each of the regions cut out in step S3 are scanned in the 0° direction to extract a feature amount and to calculate a similarity. A sum total of the similarities of all the cut-out regions is calculated, and is divided with the number of characters to obtain an average or mean similarity. Thereafter, in steps S42, S43, S44, each region is respectively scanned in the 90°, 180°, and 270° directions, and the average similarities are calculated in the same manner as in step S41.

Figure 26:
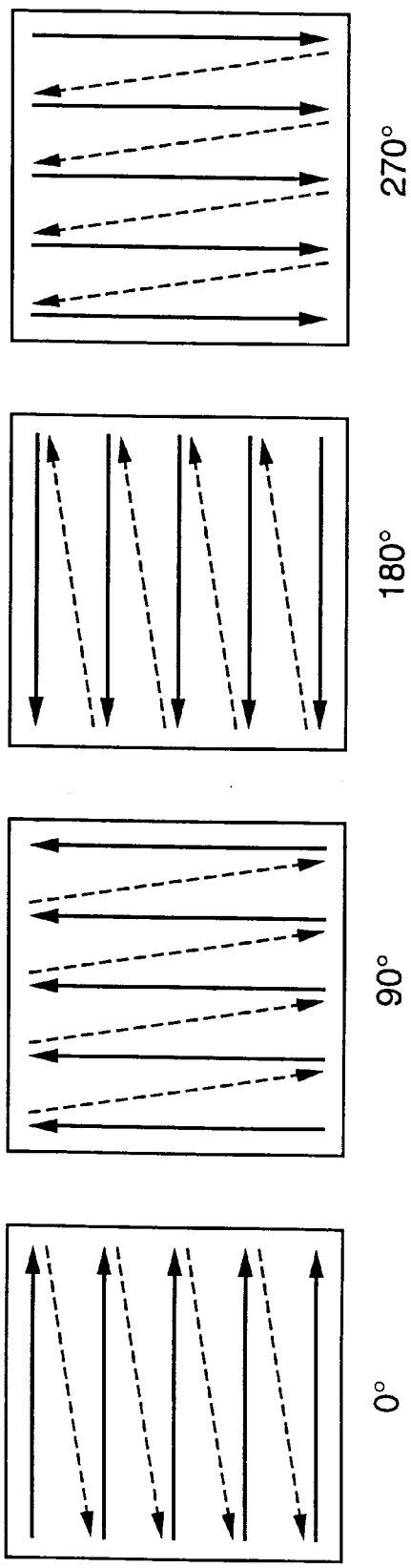
FIG. 26 is a view for explaining the scanning directions for feature amount extraction in the embodiment shown in FIG. 22.

FIG. 26 is a view for explaining the scanning direction for feature amount extraction in this embodiment. As described above, in this embodiment, the scanning operations in the four directions, i.e., 0°, 90°, 180°, and 270°, and extraction of feature amounts are performed.

Note that direction recognition processing may be performed after an image is actually rotated. However, this embodiment uses the method of changing the scanning direction, as shown in FIG. 26, so as to shorten the processing time.

The recognition processing is classified into feature extraction processing for extracting a feature from a character image as a feature amount, and recognition processing for performing matching between the obtained feature amount and predetermined features in units of characters. Upon extraction of a feature of a character, by changing the scanning direction of a character image in units of angles, the same feature amount as that obtained upon execution of feature extraction by rotating an image can be extracted without rotating an image. More specifically, as shown in FIG. 26, if the feature amount in the case of 0° is extracted by scanning a character image from the upper left position to the lower right position, the feature amount in the case of 90° can be extracted by scanning the image from the lower left position to the upper left position.

Figure 27:
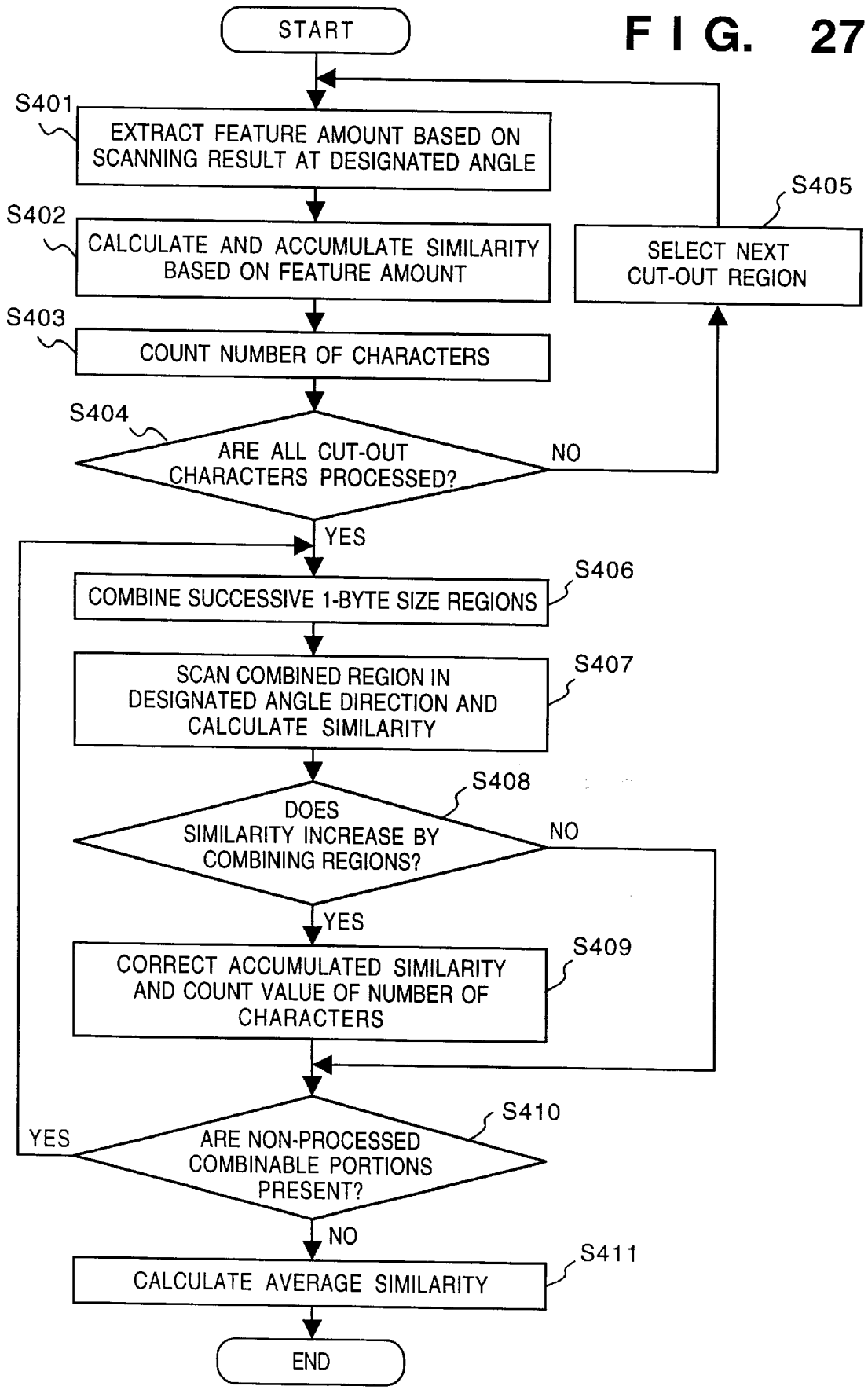
FIG. 27 is a flow chart showing the calculation sequence of an average similarity in a given scanning direction in the embodiment shown in FIG. 22.

The calculation of an average similarity in this embodiment will be explained below. FIG. 27 is a flow chart showing the calculation sequence of an average similarity in a given scanning direction in this embodiment. For example, in step S41 in FIG. 25, an average similarity obtained by the scanning operation in the 0° direction is calculated by executing the respective steps in FIG. 27 while setting a designated angle of 0°. The respective steps of FIG. 27 will be explained below with reference to a case of the scanning operation in the 0° direction. Similar processing is performed for the scanning operations in the 90°, 180°, and 270° directions.

In step S401, one cut-out region is scanned in the designated direction to acquire a feature amount. In this case, the cut-out region of interest is scanned in the 0° direction in FIG. 26. Then, a similarity is calculated by performing matching the cut-out region of interest with respective character patterns, and the calculated similarities are accumulated. The scanned cut-out region is counted as one character to count the number of characters. The above-mentioned processing is performed for all the regions cut-out in step S3 (steps S404 and S405). As a result, the sum total of the similarities and the number of characters of all the regions cut-out in step S3 can be obtained.

Upon completion of the calculations of the similarities for all the cut-out regions, the flow advances to step S406 to check if cut-out regions are respectively 1-byte characters or constitute a 2-byte character in a portion where 1-byte size regions are successively cut out.

More specifically, in a state wherein characters are cut out, only the size information and pitch information of each character are available, as shown in FIG. 28. For this reason, it cannot be discriminated whether a certain portion corresponds to a string of 1-byte characters like "1234" or to a string of 2-byte characters like "いはほ" that can be separated into 1-byte size cut-out regions. For this reason, in order to determine if a 1-byte character is a part of a 2-byte character, the best result must be selected from the results obtained by recognizing character images as 1-byte characters and the results obtained by recognizing a plurality of character regions as one character.

In step S406, of the cut-out regions, two successive 1-byte size regions are combined to one cut-out region. Each 1-byte size region can be determined based on the ratio between the length and width of a cut-out region. In step S407, the new cut-out region obtained by combining the two 1-byte size regions is scanned in the designated direction (in this case, the region is scanned in the 0° direction) to extract a feature amount and to calculate a similarity. As a result, if the similarity calculated for the combined 2-byte size region becomes larger than the similarity calculated for the non-combined 1-byte size region, it is determined that the cut-out region of interest constitutes a 2-byte character. Then, the accumulated similarity obtained and the count value of the number of characters obtained in steps S401 to S405 above are updated on the basis of the result of the combined cut-out regions (steps S408 and S409).

Figure 29B:
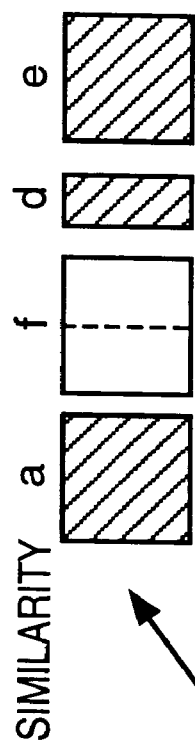
FIGS. 29A to 29C are views for explaining an example of combined 1-byte size cut-out regions.
Figure 29C:
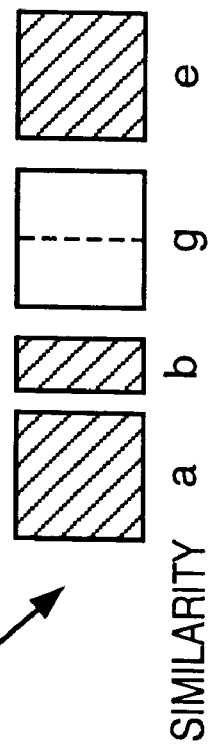
Figure 29A:
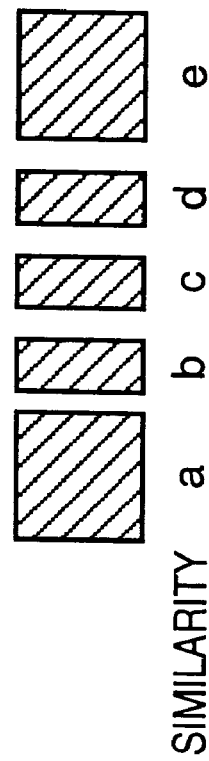

FIGS. 29A to 29C are views for explaining an example of combined 1-byte size cut-out regions. As shown in FIGS. 29A to 29C, when three 1-byte size regions align in line (FIG. 29A), two different combination methods are available (in FIGS. 29B and 29C). In this case, of the sums, b+c+d, f+d, and b+g, of the similarities, a cut-out state with the maximum similarity is selected.

The above-mentioned processing is executed for all combinable portions (step S410) to obtain a maximum similarity. The maximum similarity is divided with the count value of the number of characters at that time to obtain an average similarity (step S411). The reason why the average similarity is used is that the number of characters varies in units of angles due to the combining processing when the above-mentioned processing is performed in the scanning directions of 0°, 90°, 180°, and 270°.

In the above-mentioned feature amount extraction processing, as shown in FIG. 26 as well, a feature amount equivalent to that obtained by rotating an image is acquired by changing the scanning direction of an image of the cut-out region. However, the feature amount acquisition method corresponding to rotated images is not limited to this method. Another feature amount acquisition method corresponding to rotated images will be described below with reference to FIGS. 30 to 32.

Figure 30:
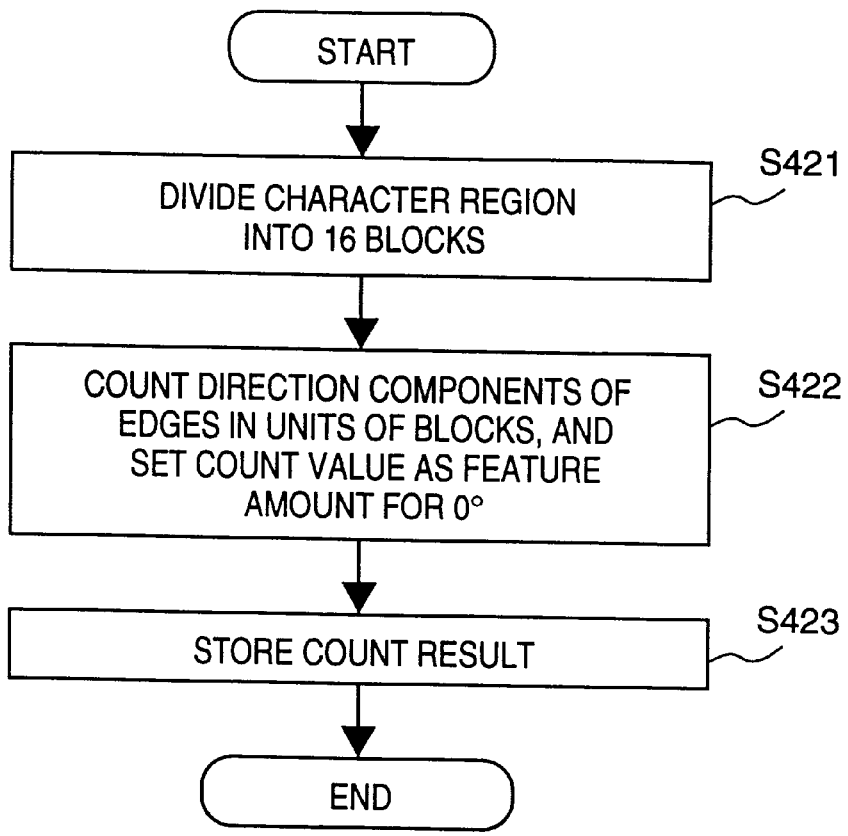
FIG. 30 is a flow chart for explaining another method of acquiring feature amounts corresponding to a rotated image.
Figure 31:
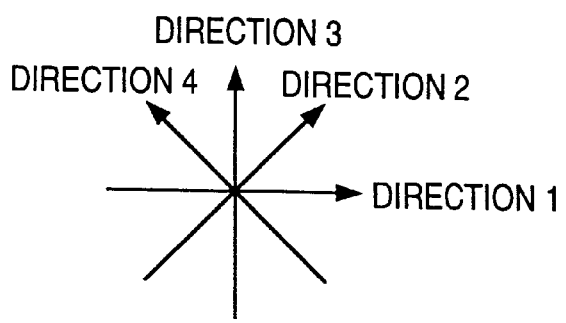
FIG. 31 is a view showing blocks divided in correspondence with cut-out regions and direction components used for acquiring feature amounts by the other method.

FIG. 30 is a flow chart for explaining another feature amount acquisition method corresponding to rotated images. FIG. 31 is a view showing divided blocks corresponding to cut-out regions and direction components for feature amount acquisition by the other method. FIG. 32 is a table showing the data storage state by the other feature amount acquisition method.

According to the method to be described below, a temporarily extracted feature amount is used as a reference amount, and the feature amount of a rotated character image is extracted by converting the reference amount. In step S421, a character image (cut-out region) is divided into blocks 1 to 16, as shown in FIG. 31. In step S422, the frequencies of direction components of directions 1 to 4 in FIG. 31 are counted for an edge image included in each block, and are used as feature amounts. The obtained feature amounts in units of direction components of each block are stored in the RAM 13, as shown in FIG. 32.

After the feature amount of 0° is extracted, the feature amounts of 90°, 180°, and 270° can be generated based on the feature amount of 0°. More specifically, the feature amount of 90° can be generated in such a manner that the feature amounts of directions 1 and 3, and those of directions 2 and 4 are replaced with each other, data of block 1 is moved to block 4, data of block 2 is moved to block 8, and so on. The feature amounts of 180° and 270° can also be acquired by replacing the feature amounts of the respective blocks and direction components. With this method, since the feature amount extraction can be attained by only replacing data without accessing an image, higher-speed processing than the method shown in FIG. 26 can be realized.

Either way, an image itself need not be rotated, and feature amount extraction in units of angles can be performed at high speed.

Figure 33:
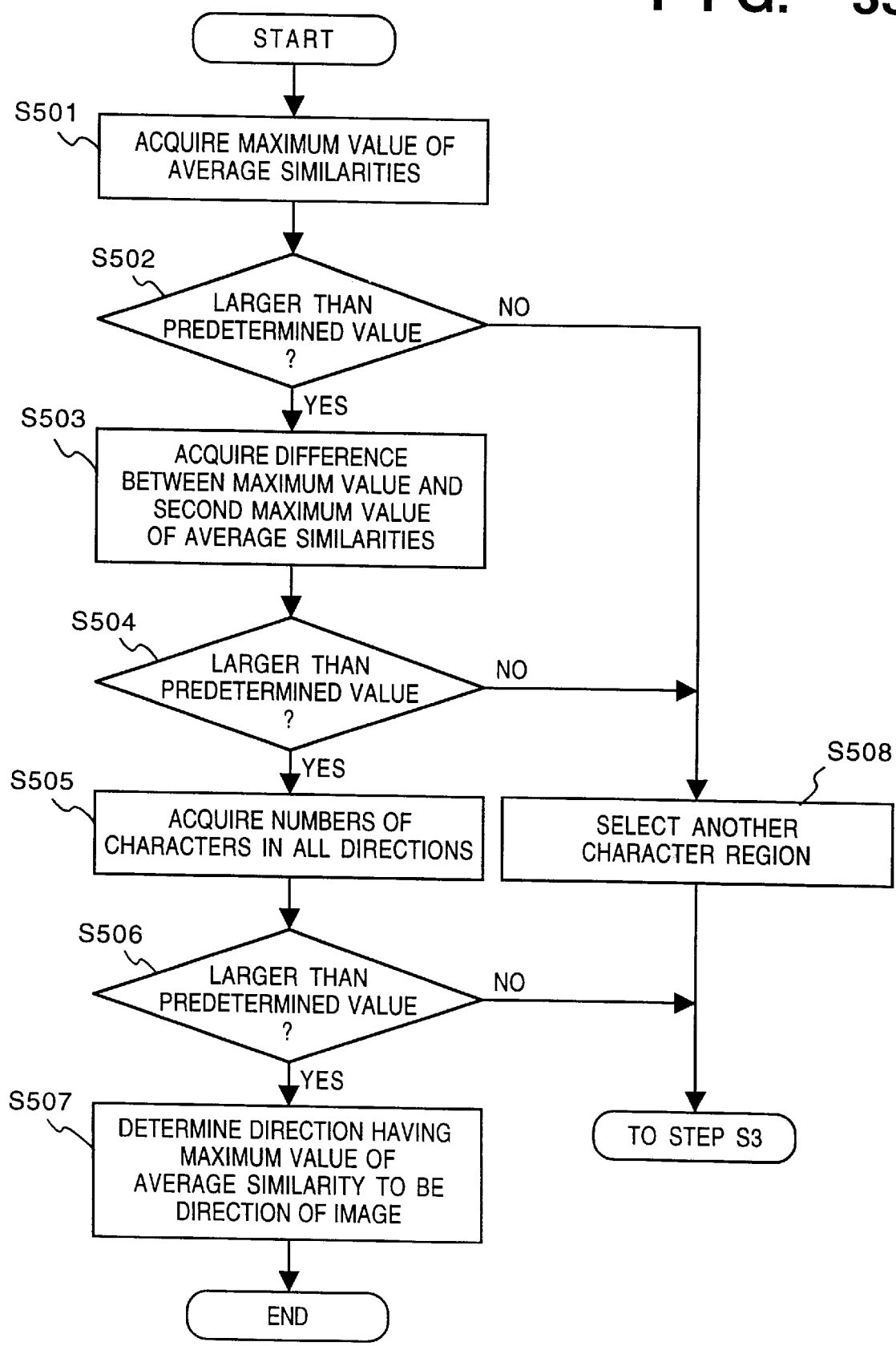
FIG. 33 is a flow chart showing the direction determination sequence in the embodiment shown in FIG. 22.

After the average similarities are obtained in units of angles, the recognition result is discriminated in step S5. The discrimination processing will be described in more detail below. FIG. 33 is a flow chart showing the direction determination sequence in this embodiment.

In step S501, the highest average similarity is extracted. In step S502, it is checked if the average similarity is larger than a predetermined value. Although a direction having the highest average similarity is determined to be a normal direction, that portion of interest may not be a character region at the time of character region extraction. When the type of character region does not match a recognition means used in direction discrimination, e.g., when the type of character region is a halftone dot screen, the direction discrimination cannot be normally performed. In view of this problem, when the average similarity of the direction in the first place is lower than the predetermined value, the flow advances from step S502 to step S508, and another character region is used for discrimination.

Figure 34:
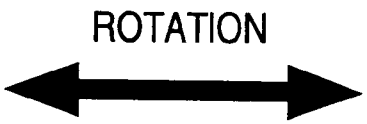
FIG. 34 is a view showing an example of a character string whose rotation is not easily identified.

On the other hand, when characters with large similarities are present like in "1+100=101" independently of any of the four recognition processing directions, the similarities of the respective directions have a small difference. In addition, in this example, images of numerals 1 and 0 rotated counterclockwise through 270° may be recognized as Chinese numerals "—" and "○" with high probability. For this reason, even when intelligent processing such as grammatical structure analysis is performed, a normal direction cannot be determined (see FIG. 34). Since it is improper to use such a character region in discrimination of the document direction, another character region must be used for direction discrimination. Therefore, in step S503, the difference between the average similarities of the first and second places is calculated. If the difference between the average similarities of the directions in the first and second places is small, the flow advances from step S504 to step S508 to use another character region in direction discrimination in place of the character region of interest.

Furthermore, the count values of the numbers of characters in the four directions are different from each other, as described above. When the final number of characters is smaller than a predetermined value, the flow returns to step S3, and the remaining characters in the character region of interest are additionally cut out (steps S505 and S506). If all the characters have been cut out from the character region of interest, the processing is executed for another character region extracted in step S2, as has been described above with reference to the flow chart in FIG. 24.

When the above-mentioned condition is satisfied, a direction having the maximum average similarity is determined as the direction of the image of interest, and the discrimination result is output (step S507).

As described above, according to this embodiment, the direction of an original is discriminated by discriminating the direction of a character, and an image is rotated as needed on the basis of the discrimination result. Thereafter, the image is stored as electronic filing data. For this reason, even when an original image is read in a wrong direction, the read image is automatically rotated in a normal direction and the rotated image is stored, thus remarkably improving operability.

Upon extraction of a feature amount of a rotated image from a cut-out region, since an image itself need not be rotated, the processing speed can be increased.

As for 2-byte and 1-byte characters, since cut-out regions are combined to maximize similarity, the similarity can be calculated with high precision.

In this embodiment, all the continuous 1-byte size cut-out regions are combined. Alternatively, only 1-byte size regions having similarities equal to or smaller than a predetermined value may be combined.

According to the above embodiment, when the difference between the average similarities in the first and second places is equal to or smaller than the predetermined value, it is determined that the direction of an original cannot be discriminated, and direction discrimination processing is repeated using another character region. For this reason, the determination of a direction using numerals or the like which are difficult to identify the direction can be avoided, and the direction of an original can be determined with high precision.

Figure 35:
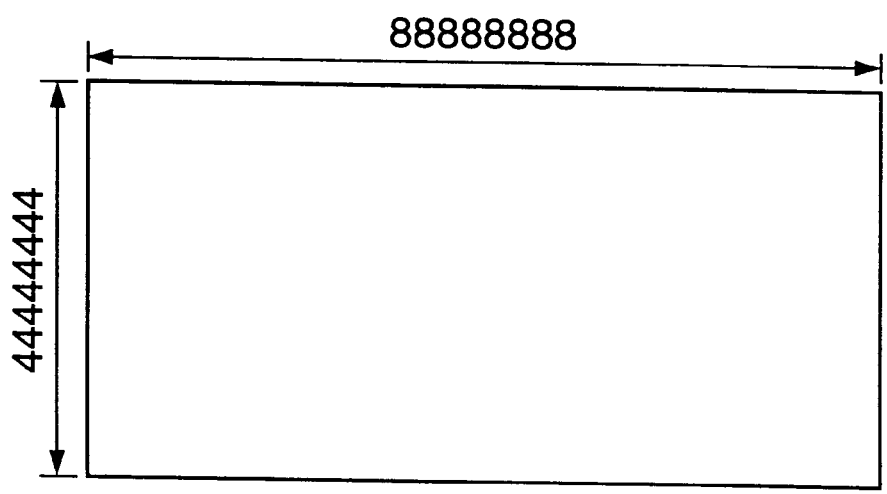
FIG. 35 is a view showing an example of the directions of characters described in a document.

When a figure is described in an original document, characters in the figure may often be written in a direction different from a normal document direction. For example, as shown in FIG. 35, numerals that represent dimensions are often written in a direction different from a normal document direction. In the extraction of character regions in step S2 above, if characters in the figure or characters close to the figure are extracted, the character regions in the figure are ignored or are set to have low priority of discrimination processing so as to avoid use of such characters as much as possible.

On the other hand, in the case of an original on which only characters in a figure or characters close to a figure are present, if there are a plurality of such originals, the image direction is determined by the majority of the respective discrimination results.

Similarly, characters in a table may be numerals with high probability. Numerals such as "11, 6, 8, 9, 0" are difficult to discriminate even when they are rotated and are subjected to recognition processing. Thus, in the extraction of character regions in step S2, the use of a character region in a table is avoided as much as possible by setting low priority of discrimination processing.

As a method of discriminating a character region, a figure, and a table from image data obtained by reading an original image, a method of extracting an independent group of black pixels from the image data, and discriminating an image on the basis of the size, arrangement, and the relationship between its inner and outer portions of the group is known. As a method of extracting black pixels, a labelling method, a method based on edge tracing, and the like are available.

On the other hand, in step S2, character regions may be sorted in the size order, and may be used in direction discrimination in the order from larger character regions. Alternatively, upon extraction of character regions in step S2, if the number of characters in each character regions can be determined, the character regions may be sorted in the order of larger numbers of characters, and the character regions may be used in direction discrimination in the sorted order. In this manner, since the cut-out regions corresponding to the required number of characters can be obtained from the first character region with high probability, higher-speed processing is realized.

Furthermore, in steps S2 and S3, a region having a predetermined size or larger is searched for from the character regions, and the found region may be used in direction discrimination. If this processing is performed up to the last character region, the skipped character region is used in direction discrimination. In this case, since processing such as sorting is not required, high-speed processing is assured when the number of extracted character regions is large.

Furthermore, in the character cut-out processing in step S3, a predetermined number or more of characters may be cut out except for characters which cannot be discriminated as 1- or 2-byte size characters, and only the cut-out characters may be subjected to recognition in the 0°, 90°, 180°, and 270° directions to calculate similarities in units of angles. Since only characters which can be determined as either 1- or 2-byte size characters are used, the numbers of characters of the respective angles become equal to each other, and the management of the number of character is simplified. Since only a portion with high character cut-out precision is subjected to direction discrimination processing, the discrimination result can have high reliability. The same effect can be obtained when only 2-byte size cut-out regions are used.

Furthermore, in a system in which the direction of an original is limited to either the portrait or landscape direction, discrimination of 0° or 180° need only be performed.

In the above embodiment, the present invention is applied to the electronic filing apparatus. However, the present invention is not limited to this. For example, when the present invention is applied to a digital copying machine, if original pages have different directions, images in wrong directions can be automatically rotated, and all the images can be formed on recording sheets in a normal direction. Therefore, the page direction need not be manually adjusted later, thus improving operability.

In the above embodiment, after an original image for one page is read, the direction discrimination of the image is performed. However, the present invention is not limited to this. For example, an original image may be read in units of portions (by band processing), and the read portions may be subjected to direction discrimination processing. When the discrimination result is obtained, the processing in units of bands is completed, and direction correction processing is started. With this control, since direction discrimination can be performed while scanning an original, the direction discrimination can be attained more quickly. Characters across bands are combined with those of previous bands.

Since the recognition processing is not performed for all the characters in a document, high-speed processing can be performed.

Since 2-byte size characters/1-byte size characters are discriminated in the four directions, unnecessary patterns that lower recognition precision can be removed, and the direction discrimination precision can be further improved.

Since only characters which are assumed to be 2-byte size characters are used in discrimination, no discrimination based on recognition precision of 2-byte size characters/1-byte size characters is required. Since the numbers of characters in the four directions are equal to each other, the average similarities need not be calculated, and the image direction can be determined based on the sum totals of similarities.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

What is claimed is:

1. An image processing method comprising:
   a cut-out step of cutting out a plurality of character images from an original image;
   a calculation step of calculating similarities, in a plurality of directions, of the character images cut out in the cut-out step;
   a first determination step of determining whether or not a difference between the greatest calculated similarity and the second greatest calculated similarity is larger than a predetermined value; and
   a second determination step of determining a direction of the original image as one of the plurality of directions on the basis of the sum of the similarities calculated in the calculation step in a case where, in said first determination step, the difference between the similarities is determined to be larger than the predetermined value.

2. The method according to claim 1, wherein the plurality of directions are four directions of 0°, 90°, 180°, and 270°.

3. The method according to claim 1, wherein the cut-out processing is completed when a predetermined number of character images are cut out in the cut-out step.

4. The method according to claim 1, further comprising the updating step of forming a new character image by combining the plurality of cut-out images, and updating the similarity obtained in the calculation step on the basis of a similarity of the new updated image when the similarity is improved by the new character image.

5. The method according to claim 4, wherein the updating step includes the step of forming a 2-byte size character image by combining 1-byte size character images when the 1-byte size character images successively appear, and updating the similarity obtained in the calculation step on the basis of a similarity obtained based on the 2-byte size character image when the similarity based on the 2-byte size character image is higher than the similarity obtained based on the 1-byte character image.

6. The method according to claim 5, wherein the updating step includes the step of combining 1-byte size character images to obtain a 2-byte character image when the 1-byte size character images have similarities smaller than a predetermined value.

7. The method according to claim 1, wherein the calculation step includes the step of calculating similarities in units of directions in correspondence with character images which are determined to be 2-byte size characters, and
   the determination step includes the step of determining the direction of the image on the basis of sum totals of the similarities in units of directions calculated in the calculation step.

8. The method according to claim 1, further comprising the control step of controlling the cut-out step to additionally cut out character images when the number of characters used in direction discrimination in the calculation step is smaller than a predetermined value, and repetitively executing the calculation step and the determination step.

9. The method according to claim 1, further comprising the control step of controlling the cut-out step to cut out character images from another character region when a difference between similarities in the first and second places of the similarities calculated in the calculation step is smaller than a predetermined value, and repetitively executing the calculation step and the determination step.

10. The method according to claim 1, further comprising the control step of controlling the cut-out step to cut out character images from another character region when a similarity in the first place of the similarities calculated in the calculation step is smaller than a predetermined value, and repetitively executing the calculation step and the determination step.

11. The method according to claim 1, wherein when an image includes a figure or table region, a character region in the figure or table region is assigned low priority upon cutting out character images in the cut-out step.

12. The method according to claim 1, wherein the plurality of directions include two directions of 0° and 180°.

13. The method according to claim 1, further comprising the output step of rotating the image as needed on the basis of the direction of the image determined in the determination step and outputting the image.

14. The method according to claim 1, further comprising the output step of rotating the image as needed on the basis of the direction of the image determined in the determination step and outputting the image.

15. The method according to claim 1, wherein the calculation step includes the step of calculating similarities corresponding to the plurality of directions by calculating similarities while changing a scanning direction of a cut-out character image.

16. The method according to claim 1, wherein the calculation step includes the step of dividing a cut-out character image into a predetermined number of blocks, counting direction components of the image in units of blocks by performing scanning in a predetermined direction, storing count values corresponding to the direction components in units of blocks as feature data, calculating feature data in directions other than the predetermined direction by replacing the count values in units of blocks and in units of direction components, and calculating similarities on the basis of the obtained feature data in the respective directions.

17. An image processing apparatus comprising:
cut=out means for cutting out a plurality of character images from an original image;
calculation means for calculating similarities, in a plurality of directions of the character images cut out by said cut-out means;
first determination means for determining whether or not a difference between the greatest calculated similarity and the second greatest similarity is larger than a predetermined value; and
second determination means for determining a direction of the image as one of the plurality of directions on the basis of the sum of the similarities calculated by said calculation means in a case where said first determination means determines that the difference between the similarities is larger than the predetermined value.

18. The apparatus according to claim 17, wherein the plurality of directions are four directions of 0°, 90°, 180°, and 270°.

19. The apparatus according to claim 17, wherein the cut-out processing is completed when a predetermined number of character images are cut out by said cut-out means.

20. The apparatus according to claim 17, further comprising updating means for forming a new character image by combining the plurality of cut-out images, and updating the similarities obtained by said calculation means on the basis of a similarity of the new updated image when the similarity is improved by the new character image.

21. The apparatus according to claim 20, wherein said updating means forms a 2-byte size character image by combining 1-byte size character images when the 1-byte size character images successively appear, and updates the similarity obtained by said calculation means on the basis of a similarity obtained based on the 2-byte size character image when the similarity based on the 2-byte size character image is higher than the similarity obtained based on the 1-byte character image.

22. The apparatus according to claim 21, wherein said updating means combines 1-byte size character images to obtain a 2-byte size character image when the 1-byte size character images have similarities smaller than a predetermined value.

23. The apparatus according to claim 17, wherein said calculation means calculates similarities in units of directions in correspondence with character images which are determined to be 2-byte size characters, and said determination means determines the direction of the image on the basis of sum totals of the similarities in units of directions calculated by said calculation means.

24. The apparatus according to claim 17, further comprising control means for controlling said cut-out means to additionally cut out character images when the number of characters used in direction discrimination of said calculation means is smaller than a predetermined value, and repetitively operating said calculation means and said determination means.

25. The apparatus according to claim 17, further comprising control means for controlling said cut-out means to cut out character images from another character region when a difference between similarities in the first and second places of the similarities calculated by said calculation means is smaller than a predetermined value, and repetitively operating said calculation means and said determination means.

26. The apparatus according to claim 17, further comprising control means for controlling said cut-out means to cut out character images from another character region when a similarity in the first place of the similarities calculated by said calculation means is smaller than a predetermined value, and repetitively operating said calculation means and said determination means.

27. The apparatus according to claim 17, wherein when an image includes a figure or table region, a character region in the figure or table region is assigned low priority upon cutting out character images by said cut-out means.

28. The apparatus according to claim 17, wherein the plurality of directions include two directions of 0° and 180°.

29. The apparatus according to claim 17, further comprising output means for rotating the image as needed on the basis of the direction of the image determined by said determination means and outputting the image.

30. The apparatus according to claim 17, further comprising output means for rotating the image as needed on the basis of the direction of the image determined by said determination means and outputting the image.

31. The apparatus according to claim 17, wherein said calculation means calculates similarities corresponding to the plurality of directions by calculating similarities while changing a scanning direction of a cut-out character image.

32. The apparatus according to claim 17, wherein said calculation means divides a cut-out character image into a predetermined number of blocks, counts direction components of the image in units of blocks by performing scanning in a predetermined direction, stores count values corresponding to the direction components in units of blocks as feature data, calculates feature data in directions other than the predetermined direction by replacing the count values in units of blocks and in units of direction components, and calculates similarities on the basis of the obtained feature data in the respective directions.

33. A computer readable memory for storing a program of image processing, comprising the codes of:
a cut-out step of cutting out a plurality of character images from an original image;
a calculation step of calculating similarities, in a plurality of directions, of the character images cut out in the cut-out step;
a first determination step of determining whether or not a difference between the greatest calculated similarity and the second greatest calculated similarity is larger than a predetermined value; and a second determination step of determining a direction of the original image as one of the plurality of directions on the basis of the sum of the similarities calculated in the calculation step in a case where, in said first determination step, the difference between the similarities is determined to be larger than the predetermined value.

34. A method of rotating, by 90° degrees, an image block having a predetermined number of lines by a predetermined number of columns, comprising the steps of:
   (a) packing a plurality of adjacent lines in the block into a continuous area;
   (b) masking a content of the area so as to leave pixels of interest included in a column of interest in the block;
   (c) shifting the content of the area by a predetermined shift amount to move a half of the pixels of interest such that a linear positional relationship of the half of the pixels of interest with respect to a remaining half of the pixels is identical after completing the rotation; and
   (d) performing an OR operation between the content of the area before shifting and the content of the area resulting from the shifting,
   wherein said steps (c) and (d) are repeated until all pixels of interest are moved to the same relative positions after completing the rotation, and said steps (a) to (d) are repeated until all columns in the block are rotated.

35. A method according to claim 34, wherein a first half and a second half of the block are packed into first and second continuous areas, respectively, in step (a), and the first and second continuous areas are integrated when step (d) is executed the first time.

36. A method according to claim 35, wherein the block has 8 lines by 8 columns of pixels, and the first 32 pixels and latter 32 pixels of the block are packed in the continuous areas as the first and second halves respectively in step (a),
   in each of four pairs of pixels, a positional relationship of two pixels in each of the pair obtained in steps (c) and (d) when executed the first time is identical to a positional relationship of two pixels after rotation,
   in each of two sets of four pixels, a positional relationship among four pixels in each of the sets obtained in steps (c) and (d) when executed for the second time is identical to a positional relationship of four pixels after rotation, and
   a positional relationship among eight pixels obtained in steps (c) and (d) when executed for the third time is identical to a positional relationship of eight pixels after rotation.

37. A method according to claim 35, wherein, in step (c), the content of the first area is shifted so that the pixels of interest in the first area become least significant pixels of every byte of the first area and the content of the second area is shifted so that the pixels of interest in the second area are arranged in fourth pixels from the least significant pixels of every byte of the second area at the first time of executing step (c), the content of the first area is shifted by 7 pixels to the right at the second time of executing step (c), and the content of the first area is shifted by 14 pixels to the right at the third time of executing step (c).

38. An apparatus for rotating by 90° degrees an image block having a predetermined number of lines by a predetermined number of columns, comprising:
   packing means for packing a plurality of adjacent lines in the block into a continuous area;
   masking means for masking a content of the area so as to leave pixels of interest included in a column of interest in the block; and
   shifting means for shifting the content of the area by a predetermined shift amount to move a half of the pixels of interest such that a linear positional relationship of the half of the pixels of interest with respect to a remaining half of the pixels of interest is identical after completing the rotation; and
   overlaying means for performing an OR operation between the content of the area before shifting and the content of the area resulting from shifting,
   wherein shifting by said shifting means and the OR operation by said overlaying means are repeated until all of the pixels of interest are moved to the same relative positions after completing the rotation, and wherein packing by said packing means masking by said masking means shifting by said shifting means, and the OR operation by said overlaying means are repeated until all columns in the block are rotated.

39. An apparatus according to claim 38, wherein a first half and a second half of the block are packed into first and second continuous areas, respectively, by said packing means, and the first and second continuous areas are integrated by said overlaying means.

40. An apparatus according to claim 39, wherein the block has 8 lines by 8 columns of pixels, and the first 32 pixels and latter 32 pixels of the block are packed in the continuous areas as the first and second halves respectively by said packing means,
   in each of four pairs of pixels, a positional relationship of two pixels in each of the pair obtained by said shifting means and said overlaying means executed the first time is identical to a positional relationship of two pixels after rotation,
   in each of two sets of four pixels, a positional relationship among four pixels in each of the sets obtained by said shifting means and said overlaying means executed for the second time is identical to a positional relationship of four pixels after rotation, and
   a positional relationship among eight pixels obtained by said shifting means and said overlaying means executed for the third time is identical to a positional relationship of eight pixels after rotation.

41. A method according to claim 39, wherein, said shifting means shifts the content of the first area so that the pixels of interest in the first area become least significant pixels of every byte of the first area and shifts the content of the second area so that the pixels of interest in the second area are arranged in fourth pixels from the least significant pixels of every byte of the second area at the first time of shifting, the content of the first area is shifted by 7 pixels to the right at the second time of shifting, and the content of the first area is shifted by 14 pixels to the right at the third time of shifting.

42. An apparatus according to claim 38, further comprising output means for outputting the rotated image block.

43. An apparatus according to claim 42, wherein said output means includes a printer.

44. An apparatus according to claim 42, wherein said output means includes a display.

45. A computer program for rotating by 90° degrees an image block having a predetermined number of lines by a predetermined number of columns, stored in a computer-readable medium, having processing steps of:
   (a) packing a plurality of adjacent lines in the block into a continuous area;
   (b) masking a content of the area so as to leave pixels of interest included in a column of interest in the block;

(c) shifting the content of the area by a predetermined shift amount to move a half of the pixels of interest such that a linear positional relationship of the half of the pixels of interest with respect to a remaining half of the pixels is identical after completing the rotation; and (d) performing an OR operation between the content of the area before shifting and the content of the area resulting from the shifting, wherein said steps (c) and (d) are repeated until all pixels of interest are moved to the same relative positions after completing the rotation, and said steps (a) to (d) are repeated until all columns in the block are rotated.

46. A computer program according to claim 45, wherein a first half and a second half of the block are packed into first and second continuous areas, respectively, in step (a), and the first and second continuous areas are integrated when step (d) is executed the first time.

47. A computer program according to claim 46, wherein the block has 8 lines by 8 columns of pixels, and the first 32 pixels and latter 32 pixels of the block are packed in the continuous areas as the first and second halves respectively in step (a), in each of four pairs of pixels, a positional relationship of two pixels in each of the pair obtained in steps (c) and (d) when executed the first time is identical to a positional relationship of two pixels after rotation, in each of two sets of four pixels, a positional relationship among four pixels in each of the sets obtained in steps (c) and (d) when executed for the second time is identical to a positional relationship of four pixels after rotation, and a positional relationship among eight pixels obtained in steps (c) and (d) when executed for the third time is identical to a positional relationship of eight pixels after rotation.

48. A computer program according to claim 46, wherein, in step (c), the content of the first area is shifted so that the pixels of interest in the first area become least significant pixels of every byte of the first area and the content of the second area is shifted so that the pixels of interest in the second area are arranged in fourth pixels from the least significant pixels of every byte of the second area at the first time of executing step (c), the content of the first area is shifted by 7 pixels to the right at the second time of executing step (c), and the content of the first area is shifted by 14 pixels to the right at the third time of executing step (c).

49. An apparatus for rotating image data having a predetermined number of bits by a predetermined number of lines, comprising:

first means for dividing the image data into first and second groups and storing data of the first and second groups, respectively;

second means for obtaining first masked data where bits of interest in data of the first group are shifted by a predetermined amount and other bits are masked, obtaining second masked data by masking data of the second group except for bits of interest, and obtaining combined data by combining the first and second masked data such that a positional relationship of the bits of interest in the first group with respect to the bits of interest in the second group is identical to a positional relationship of the bits in a line of interest after rotation of the image data; and third means for shifting the combined data by a predetermined shift amount and combining the shifted data with the combined data such that the bits of interest have a positional relationship in the line of interest after completing the rotation, wherein said first, second and third means perform rotation processing until completing rotation of the image data.

50. An apparatus according to claim 49, wherein the image data consists of eight bits by eight lines, said first means divides the image data into first four lines and second four lines and stores the divided image data respectively, said second means obtains the first masked data by shifting data of the first group by four bits in the left direction and masking the shifted data except for the bits of interest, obtains the second masked data by masking data of the second group except for the bits of interest, and obtains first combined data by combining the first masked data and the second masked data, and said third means shifts the first combined data by seven bits in the right direction and combines the seven-bit-shifted data with the first combined data so as to obtain second combined data, and further shifts the second combined data by fourteen bits in the right direction and combines the fourteen-bit-shifted data with the second combined data.

51. An apparatus according to claim 49, further comprising output means for outputting rotated image data.

52. An apparatus according to claim 51, wherein said output means outputs the rotated image data by a printer.

53. An apparatus according to claim 49, wherein the image data is rotated by 90°, 180° or 270° degrees.

54. A method of rotating image data having a predetermined number of bits by a predetermined number of lines, comprising:

a first step of dividing the image data into first and second groups and storing data of the first and second groups, respectively;

a second step of obtaining first masked data where bits of interest in data of the first group are shifted by a predetermined amount and other bits are masked, obtaining second masked data by masking data of the second group except for bits of interest, and obtaining combined data by combining the first and second masked data such that a positional relationship of the bits of interest in the first group with respect to the bits of interest in the second group is identical to a positional relationship of the bits in a line of interest after rotation of the image data; and a third step of shifting the combined data by a predetermined shift amount and combining the shifted data with the combined data such that the bits of interest have a positional relationship in the line of interest after completing the rotation, wherein said first, second and third steps are performed until completing rotation of the image data.

55. A method according to claim 54, wherein the image data consists of eight bits by eight lines, said first step divides the image data into first four lines and second four lines and stores the divided image data respectively, said second step obtains the first masked data by shifting data of the first group by four bits in the left direction and masking the shifted data except for the bits of interest, obtains the second masked data by masking data of the second group except for the bits of interest, and obtains first combined data by combining the first masked data and the second masked data, and said third step shifts the first combined data by seven bits in the right direction and combines the seven-bit-shifted data with the first combined data so as to obtain second combined data, and further shifts the second combined data by fourteen bits in the right direction and combines the fourteen-bit-shifted data with the second combined data.

56. A method according to claim 54, further comprising an output step of outputting rotated image data.

57. A method according to claim 56, wherein said output step comprises outputting the rotated image data by a printer.

58. A method according to claim 54, wherein the image data is rotated by 90°, 180° or 270° degrees.

59. A computer-readable medium storing a computer program to rotate image data having a predetermined number of bits by a predetermined number of lines, said program comprising codes to perform the following steps:

a first step of dividing the image data into first and second groups and storing data of the first and second groups, respectively;

a second step of obtaining first masked data where bits of interest in data of the first group are shifted by a predetermined amount and other bits are masked, obtaining second masked data by masking data of the second group except for bits of interest, and obtaining combined data by combining the first and second masked data such that a positional relationship of the bits of interest in the first group with respect to the bits of interest in the second group is identical to a positional relationship of the bits in a line of interest after rotation of the image data; and a third step of shifting the combined data by a predetermined shift amount and combining the shifted data with the combined data such that the bits of interest have a positional relationship in the line of interest after completing the rotation, wherein said first, second and third steps are performed until completing rotation of the image data.

60. A medium according to claim 59, wherein the image data consists of eight bits by eight lines, said first step divides the image data into first four lines and second four lines and stores the divided image data respectively, said second step obtains the first masked data by shifting data of the first group by four bits in the left direction and masking the shifted data except for the bits of interest, obtains the second masked data by masking data of the second group except for the bits of interest, and obtains first combined data by combining the first masked data and the second masked data, and said third step shifts the first combined data by seven bits in the right direction and combines the seven-bit-shifted data with the first combined data so as to obtain second combined data, and further shifts the second combined data by fourteen bits in the right direction and combines the fourteen-bit-shifted data with the second combined data.

61. A medium according to claim 59, further comprising an output step of outputting rotated image data.

62. A medium according to claim 61, wherein said output step comprises outputting the rotated image data by a printer.

63. A medium according to claim 59, wherein the image data is rotated by 90°, 180° or 270° degrees.

* * * * *

UNITED STATES PATENT AND TRADEMARK OFFICE
CERTIFICATE OF CORRECTION

PATENT NO. : 5,966,138

DATED : October 12, 1999

INVENTOR(S): TETSUOMI TANAKA

It is certified that error appears in the above-identified patent and that said Letters Patent is hereby corrected as shown below:

COLUMN 1

Line 25, "$P_{13}$" should read --p_--.
Line 26, "p_from[0]." should read --p_from[0],--.

COLUMN 9

Line 5, "90° rotated" should read --90°-rotated--.

COLUMN 11

Line 17, "90° rotated" should read --90°-rotated--.

COLUMN 15

Line 2, "the" (first occurrence), should be deleted.
Line 24, "14bits" should read --14 bits--.

UNITED STATES PATENT AND TRADEMARK OFFICE
CERTIFICATE OF CORRECTION

PATENT NO. : 5,966,138

DATED : October 12, 1999

INVENTOR(S): TETSUOMI TANAKA

It is certified that error appears in the above-identified patent and that said Letters Patent is hereby corrected as shown below:

COLUMN 25

Line 24, "cut=out" should read --cut-out--.

Signed and Sealed this

Nineteenth Day of September, 2000

Attest:

Q. TODD DICKINSON

*Attesting Officer*     *Director of Patents and Trademarks*